(12) United States Patent
Adachi et al.

(10) Patent No.: US 8,798,271 B2
(45) Date of Patent: *Aug. 5, 2014

(54) COMMUNICATION SYSTEM, WIRELESS COMMUNICATION APPARATUS, AND COMMUNICATION METHOD

(75) Inventors: Tomoko Adachi, Urayasu (JP); Kiyoshi Toshimitsu, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 63 days.

This patent is subject to a terminal disclaimer.

(21) Appl. No.: 13/437,560

(22) Filed: Apr. 2, 2012

(65) Prior Publication Data

US 2012/0189123 A1   Jul. 26, 2012

Related U.S. Application Data

(60) Continuation of application No. 12/875,251, filed on Sep. 3, 2010, which is a continuation of application (Continued)

(30) Foreign Application Priority Data

Dec. 26, 2001   (JP) ................. 2001-395475

(51) Int. Cl.

| | |
|---|---|
| H04L 9/00 | (2006.01) |
| H04W 12/08 | (2009.01) |
| H04L 29/06 | (2006.01) |
| H04W 76/02 | (2009.01) |
| H04W 4/06 | (2009.01) |
| H04W 28/18 | (2009.01) |
| H04W 88/02 | (2009.01) |

(52) U.S. Cl.
CPC .............. H04L 63/04 (2013.01); H04W 12/08 (2013.01); H04L 63/105 (2013.01); H04W 76/02 (2013.01); H04W 4/06 (2013.01); H04W 28/18 (2013.01); H04W 88/02 (2013.01)
USPC ............................................. 380/270; 726/4

(58) Field of Classification Search
CPC ................................................ H04W 28/18

USPC ........................................ 380/270; 726/4, 6, 7
See application file for complete search history.

(56) References Cited

U.S. PATENT DOCUMENTS 5,602,916 A    2/1997 Grube et al.
(Continued)

FOREIGN PATENT DOCUMENTS

JP    09-116534    5/1997
(Continued)

OTHER PUBLICATIONS

Ansi/IEEE Std 802.11, XP-002278910, pp. 1+10-69, "Part 11: Wireless LAN Medium Access Control (MAC) and Physical Layer (PHY) Specifications," 1999.

(Continued)

*Primary Examiner* — Pramila Parthasarathy
*Assistant Examiner* — Dao Ho
(74) *Attorney, Agent, or Firm* — Oblon, Spivak, McClelland, Maier & Neustadt, L.L.P.

(57) ABSTRACT

A wireless communication circuit includes a receiver to receive at least one of a beacon frame and a probe response frame from a first wireless communication apparatus belonging to a first communication group, at least one of the beacon frame and the probe response frame including first security information indicating a first encryption method. The circuit includes a transmitter to transmit an association request frame to the first wireless communication apparatus, the association request frame including second security information indicating a second encryption method which is supported by the wireless communication circuit, after a determination that the second encryption method overlaps with the first encryption method. The transmitter declines to associate with the first wireless communication apparatus if the first encryption method fails to overlap with the second encryption method. The transmitter transmits a data frame including a frame body after a reception of an association response frame.

24 Claims, 16 Drawing Sheets

Related U.S. Application Data

No. 12/397,630, filed on Mar. 4, 2009, now Pat. No. 7,813,508, which is a division of application No. 11/837,389, filed on Aug. 10, 2007, now Pat. No. 7,519,183, which is a continuation of application No. 10/327,193, filed on Dec. 24, 2002, now Pat. No. 7,269,260.

(56) References Cited

U.S. PATENT DOCUMENTS

| | | |
|---|---|---|
| 5,615,261 A | 3/1997 | Grube et al. |
| 5,910,987 A | 6/1999 | Ginter et al. |
| 6,192,026 B1 | 2/2001 | Pollack et al. |
| 6,370,380 B1 | 4/2002 | Norefors et al. |
| 6,567,416 B1 | 5/2003 | Chuah |
| 6,621,809 B1 | 9/2003 | Lee et al. |
| 6,665,530 B1 | 12/2003 | Broyles et al. |
| 6,859,879 B2 | 2/2005 | Henn et al. |
| 6,928,166 B2 | 8/2005 | Yoshizawa |
| 6,970,583 B2 | 11/2005 | Black |
| 7,076,653 B1 | 7/2006 | Remer et al. |
| 7,107,051 B1 | 9/2006 | Walker |
| 7,174,564 B1 | 2/2007 | Weatherspoon et al. |
| 7,181,530 B1 | 2/2007 | Halasz et al. |
| 7,249,374 B1 | 7/2007 | Lear et al. |
| 7,322,041 B2 | 1/2008 | Bilgic et al. |
| 7,813,508 B2 * | 10/2010 | Adachi et al. ............... 380/270 |
| 2001/0055319 A1 | 12/2001 | Quigley et al. |
| 2002/0094087 A1 | 7/2002 | Dellmo et al. |
| 2003/0021421 A1 * | 1/2003 | Yokota et al. ............... 380/277 |
| 2005/0187883 A1 | 8/2005 | Bishop et al. |

FOREIGN PATENT DOCUMENTS

| | | |
|---|---|---|
| JP | 09-252320 | 9/1997 |
| JP | 11-220462 | 8/1999 |
| JP | 11-298532 | 10/1999 |
| WO | WO 01/63843 | 8/2001 |

OTHER PUBLICATIONS

K-T. Salli, et al., Personal Indoor and Mobile Radio Communication, The Ninth IEEE International Symposium, XP-010314696, pp. 1540-1544, "Security Design for a New Wireless Local Area Network Tutwlan," Sep. 8, 1998.

Mainak Chatterjee, et al., "A Hybrid MAC Protocol for Multimedia Traffic in Wireless Networks", Proceedings IEEE International Conference on Network 2000 (ICON2000), Sep. 5, 2000 (Singapore), pp. 30-35.

"Part 11: Wireless LAN Medium Access Control (MAC) and Physical Layer (PHY) Specifications", ANSI/IEEE Std 802.11, 1999 Edition, 1999 (USA), 528 pages.

* cited by examiner

|  | Security level | Encryption parameter | Minimum level |
|---|---|---|---|
| AP1 | enc. 1<br>enc. 2 | key1, IV1<br>key2, IV2 | ◯ |
| WL11 | enc. 1 | key1, IV1 | ✕ |
| WL12 | enc. 1<br>enc. 2 | key1, IV1<br>key2, IV2 | |

FIG. 5

|  | Security level | Encryption parameter |
|---|---|---|
| AP1 | enc. 1 | key1, IV1 |
| WL11 | enc. 1 | key1, IV1 |
| WL12 | enc. 1<br>enc. 2 | key1, IV1<br>key2, IV2 |

FIG. 6

Authentication frame body

| Authentication algorithm number | Authentication transaction number | Status code | Challenge text |
|---|---|---|---|

FIG. 8A           (ATSN)

| Authentication algorithm | Authentication transaction sequence no. | Status code | Challenge text |
|---|---|---|---|
| Open System | 1 | Reserved | Not present |
| Open System | 2 | Status | Not present |
| Shared key | 1 | Reserved | Not present |
| Shared key | 2 | Status | Present |
| Shared key | 3 | Reserved | Present |
| Shared key | 4 | Status | Not present |

※ Write security levels of connection requester (for example, terminal) in status code field with ATSN=1

FIG. 8B

Association Request Frame Body

| Capability information | Listen interval | SSID | Supportted rates |
|---|---|---|---|

FIG. 9A  | ESS | ... | Privacy | Reserved |

Association Response Frame Body

| Capability information | Status code | Association ID (AID) | Supportted rates |
|---|---|---|---|

FIG. 9B  | ESS | ... | Privacy | Reserved |

| Connection target | Security level | Encryption parameter | Minimum level |
|---|---|---|---|
| AP1 | enc. 1<br>enc. 2 | key1, IV1<br>key2, IV2 | O |
| WL11 | enc. 1 | key1, IV1 | ✕ |
| WL12 | enc. 1<br>enc. 2 | key1, IV1<br>key2, IV2 | ✕ |
| WL13 | enc. 1 | key1, IV1 | ✕ |

COMMUNICATION SYSTEM, WIRELESS COMMUNICATION APPARATUS, AND COMMUNICATION METHOD

CROSS-REFERENCE TO RELATED APPLICATIONS

This application is a continuation of U.S. Ser. No. 12/875,251 filed Sep. 3, 2010, which is a continuation of U.S. Ser. No. 12/397,630 filed Mar. 4, 2009, which is a division of U.S. Ser. No. 11/837,389 (now U.S. Pat. No. 7,519,183) filed Aug. 10, 2007, which is a continuation of U.S. Ser. No. 10/327,193 (now U.S. Pat. No. 7,269,260) filed Dec. 24, 2002, and is based upon and claims the benefit of priority from Japanese Patent Application No. 2001-395475 filed Dec. 26, 2001, the entire contents of each of which are incorporated herein by reference.

BACKGROUND OF THE INVENTION

1. Field of the Invention

The present invention relates to a communication system, a wireless communication apparatus, and a communication method, and in particular, to a wireless communication system including wireless terminals and an access point or access points.

2. Description of the Related Art

As a wireless LAN, a wireless LAN system (ISO/IEC8802-11:1999(E)ANSI/IEEE Std 802.11, 1999 edition) is known which is based on the IEEE802.11 (an IEEE802.11 system also includes an IEEE802.11a system, an IEEE802.11b system and so on). This wireless LAN system employs, as an encryption method, a method called "WEP (Wired Equivalent Privacy)" and which enables privacy to be ensured as in the case with a wired system. Consequently, the security level of a wireless LAN based on the IEEE802.11 has a WEP mode in which the WEP is applied and a non-WEP mode in which the WEP is not applied.

Practical wireless LAN products according to the IEEE802.11 can communicate in either the WEP mode in which the encryption method "WEP" is applied or the non-WEP mode in which it is not applied. Further, the WEP mode, in which the WEP is applied, includes a 64-bit encryption mode and a 128-bit encryption mode which have different encryption levels. One of these modes is applied to each of the communication or connection links in the wireless LAN to realize communication. In this case, a higher encryption level means a higher security level and stronger encryption.

One form of a wireless LAN according to the IEEE802.11 is a system constructed using a plurality of constitutional units called "basic service sets (BSSs)" each composed of one access point and a plurality of wireless clients connected to this access point.

Structural elements that connect the BSSs together are called "distribution systems (DSs)". The access point has a function of connecting to the DS. Information is transmitted between a BSS and a DS via the access point. Accordingly, a terminal can communicate with a terminal belonging to another BSS.

A terminal belongs to a BSS and requires an authentication and association procedures to be executed between itself and an access point in order to communicate with a terminal belonging to another BSS via the access point. Further, when the terminal attempts to reconnect to another access point, a reassociation procedure is executed.

For the wireless LAN specified in IEEE802.11, exchanged frames include control frames used for access control, management frames including a beacon or the like, and data frames for data communication.

Before a terminal can transmit or receive a data frame to or from an access point, an authentication and association processes must be executed.

In the wireless LAN specified in the IEEE802.11, a terminal inquires of an access point whether or not the WEP as an encryption method is used. That is, the terminal requests the access point to use the WEP. When the access point receives this request and if the WEP is available, authentication frames are transmitted between the access point and the terminal. The WEP can be used on the basis of such transmissions of authentication frames.

Another form of the wireless LAN specified in the IEEE802.11 is an independently existing BSS, which is called an "IBSS (Independent Basic Service Set)". The IBSS corresponds to a communication form in which no access points are provided and in which terminals communicate directly with each other. Further, with the IBSS, neither the association process nor the reassociation process are executed. With the IBSS, data frames can be transmitted without executing any authentication processes between terminals.

In this manner, in the conventional wireless LANs, communication data are encrypted in order to ensure security. A connection request sender, e.g. a terminal, requests a connection request receiver, e.g. an access point to use an encryption function (WEP function) for communication. If it is possible to use the WEP function according to this request, the access point, receiving this request, accepts the request and encrypts data communication with the terminal. Further, the connection request sender can also take initiative in determining what security level is used for communication.

It is expected that wireless LANs will employ, besides the WEP, a plurality of types of encryption methods with different encryption levels, including those having higher security levels than the WEP. Accordingly, it will be desirable to be able to set detailed security levels according to encryption method types, encryption levels, and the like.

However, in the conventional wireless LANs, the minimum encryption level cannot be set for each BSS in order to ensure security. It is thus impossible to make a system that permits only communication based on encryption with a level equal to or higher than the minimum one. Furthermore, it is disadvantageously impossible to set, for communication, detailed security levels according to encryption method types, encryption strengths, and the like.

Moreover, the IBSS does not require authentication when a data frame is transmitted. Thus, disadvantageously, non-encrypted data frames may be transmitted within system, thus precluding the security in the system from being ensured.

Further, security levels preset for the respective BSSs cannot be individually ensured. Likewise, in DS communication executed among a plurality of BSSs, security levels specified for the respective BSSs cannot be individually ensured.

BRIEF SUMMARY OF THE INVENTION

It is an object of the present invention to provide a wireless communication system, a wireless communication apparatus, and a communication method which enable wireless communication while ensuring a minimum security level for each basic group of a wireless LAN on the basis of encryption preset for the basic group.

According to an aspect of the present invention, there is provided a wireless communication apparatus which belongs to a wireless communication group, comprising:

a receiver unit configured to receive a first transmission frame from a wireless communication unit outside of the wireless communication group, the first transmission frame having a first field in which a notifying security level is described;

a reference memory configured to store a reference security level assigned to the wireless communication group, the reference security level being selected from security levels which depend on one of encryption methods including non-encryption and encryption strengths;

a frame generating unit, comparing the notifying security level with the reference security level, configured to determine either one of a connect rejection representing a rejection of connection to the communication unit and a connect permission representing a permission of connection to the communication unit using the notifying security level, and configured to generate a second transmission frame having a second field in which the one of the connect rejection and the connection permission is described; and a transmitting unit configure to transmit the second transmission frame directing to the wireless communication unit.

Furthermore, according to an aspect of the present invention, there is provided a wireless communication system comprising:

first and second wireless communication apparatuses which belongs to a wireless communication group and outside of the wireless communication group, respectively, the first wireless communication apparatus including:

a first receiver unit configured to receive a first transmission frame from the second wireless communication apparatus outside of the wireless communication group, the first transmission frame having a first field in which a notifying security level is described;

a first reference memory configured to store a reference security level assigned to the wireless communication group, the reference security level being selected from security levels which depend on one of encryption methods including non-encryption and encryption strengths;

a frame generating unit, comparing the notifying security level with the reference security level, configured to determine either one of a connect rejection representing a rejection of connection to the communication unit and a connect permission representing a permission of connection to the communication unit using the notifying security level, and configured to generate a second transmission frame having a second field in which the one of the connect rejection and the connection permission is described; and a transmitting unit configure to transmit the second transmission frame to the second wireless communication apparatus.

Moreover, according to an aspect of the present invention, there is provided a wireless communication method of determining a connection to a wireless communication unit with a reference security level peculiar to a wireless communication group, the method comprising:

receiving a first transmission frame having a field in which a notifying security level is described;

storing the reference security level, the reference security level being selected from security levels which depend on one of encryption methods including non-encryption and encryption strengths;

generating a second transmission frame having a second field in which one of a connect rejection and a connection permission is described, the one of the connect rejection and the connect permission being determined by comparing the notifying security level with the reference security level, the connect rejection representing a rejection of connection to the communication unit and the connection permission representing a permission of connection to the communication unit using the notifying security level; and transmitting the second transmission frame to the wireless communication unit.

BRIEF DESCRIPTION OF THE SEVERAL VIEWS OF THE DRAWING

FIG. 5 is a table showing a specific example of a security table provided in the access point or terminal in the communication system shown in FIG. 1;

FIG. 6 is table showing another specific example of a security table provided in the access point or terminal in the communication system shown in FIG. 1;

FIG. 8A is a schematic diagram showing the structure of an authentication frame specified in the IEEE802.11 and transferred between the access point and terminal in the communication system shown in FIG. 1;

FIG. 8B is a table showing contents described in items of the frame shown in FIG. 8A;

FIGS. 9A and 9B are schematic diagrams showing an association request and response frames specified in the IEEE802.11 and transferred between the access point and terminal in the communication system shown in FIG. 1;

DETAILED DESCRIPTION OF THE INVENTION

Figure 1:
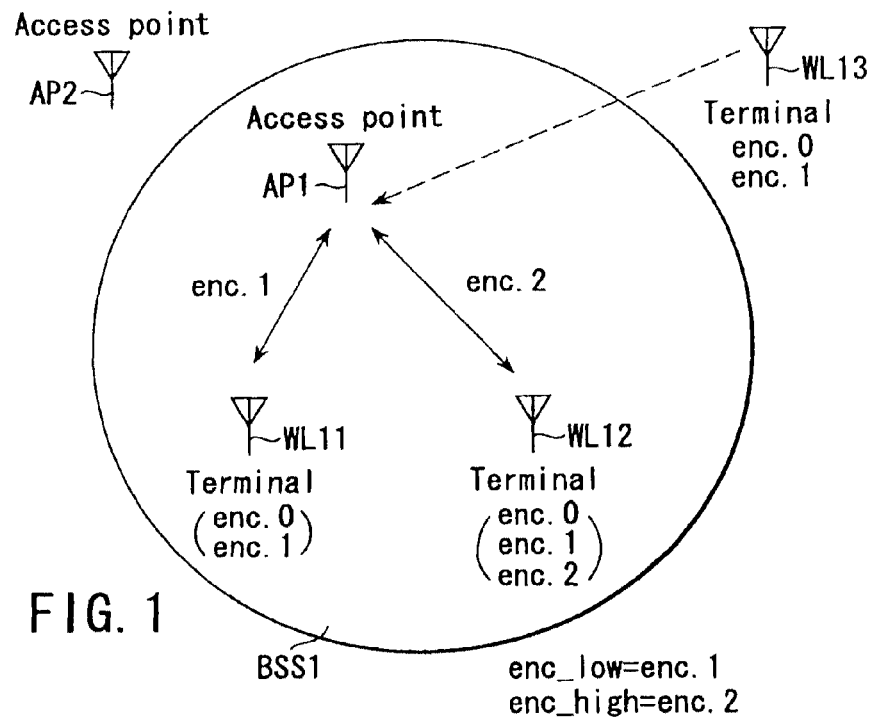
FIG. 1 is a schematic view showing a communication system according to an embodiment of the present invention.

With reference to the drawings, description will be given below of embodiments of a wireless communication system of the present invention.

First, in a wireless LAN system in the embodiments below, a plurality of types of encryption methods are applicable and are classified into several types, and security levels with ranked encryption levels are set in advance. If the plurality of types of encryption methods have different levels, the encryption levels of one type of encryption method are each ranked according to the level of encryption strength. Thus, one security level is set for each encryption level. Accordingly, even encryption methods with the same encryption strength are imparted with different security levels if they are of different types. For example, it is assumed that there are n security levels enc.0, enc.1, enc.2, . . . , enc.(n−1) in order of increasing encryption strength. It is further assumed that even a plurality of encryption methods with the same encryption strength are set to have different security levels with respective ranks according to their types. In this manner, one type of encryption method corresponds to one security level. Furthermore, if encryption methods of the same type have a plurality of levels according to differences in encryption strength, security levels are set so as to correspond to the respective encryption levels.

In a wireless LAN system specified in the current IEEE802.11, the minimum security level corresponds to no encryption, i.e. the inapplicability of the WEP (Wired Equivalent Privacy).

Wireless LAN products according to the current IEEE802.11 have two levels so that even if the WEP is applicable, it is further composed of 64 or 128 bits. Thus, in an example described below, as a plurality of security levels, there are three levels as in the case with the wireless LAN according to the current IEEE802.11: (1) "no WEP", (2) "WEP present and 64-bit WEP used", and (3) "WEP present and 128-bit WEP used". In this case, the highest security corresponds to (3) "WEP present and 128-bit WEP used". The second highest security corresponds to (2) "WEP present and 64-bit WEP used". That is, the following assumptions are made: "enc.0" corresponds to (1) "no WEP". "enc.1" corresponds to (2) "WEP present and 64-bit WEP used". "enc.2" corresponds to (3) "WEP present and 128-bit WEP used".

Description will be given below of the case in which only one type of encryption method called the "WEP" is used. However, the present invention is applicable to any encryption methods other than the WEP as described below in the embodiments provided that a plurality of levels can be set according to encryption method types and security strengths.

In the following embodiments of the present invention, description will be given of the case in which the present invention is applied to a wireless LAN system specified in the IEEE802.11. Specifically, description will be given of the case in which a wireless communication apparatus of the present invention is applied to an access point or a terminal constituting the wireless LAN system specified in the IEEE802.11.

First Embodiment

First, as a wireless communication system according to a first embodiment of the present invention, description will be given of a communication system in which one BSS (Basic Service Set) is composed of a plurality of, for example, two terminals (WL11 and WL12) and an access point AP1 to which these terminals (WL11 and WL12) are connected wirelessly.

FIG. 1 schematically shows a first BSS (hereinafter simply referred to as a "BSS1"). The BSS1 is composed of the access point AP1 and the plurality of, in this case, two wireless terminals (hereinafter referred to as "terminals") WL11 and WL12 connected to the access point AP1.

FIG. 1 also shows an access point AP2 belonging to a second BSS (hereinafter simply referred to as a "BSS2") different from the first BSS1 and a terminal WL13 that is not subscribed to the BSS1 nor BSS2.

The minimum permissible security level (enc_low) is set for the BSS1. In the wireless communication system according to this embodiment, the minimum permissible security level (enc_low) in the BSS1 is a security level "enc.1". FIG. 1 indicates the fact that the minimum permissible security level (enc_low) is the security level "enc.1", as enc_low=enc.1. The access point AP1 is assumed to support not only the security level "enc.1" but also a security level "enc.2", which is higher than the security level "enc.1". Accordingly, the maximum security level (enc_high) available in the BSS1 is "enc.2". FIG. 1 indicates the fact that the maximum security level (enc_high) is "enc.2", as enc_high=enc.2. The access point AP1 is provided beforehand with such setting that it communicates with terminals or access points connected to it, at the security level "enc.1" or higher. Likewise, the access point AP1 is provided beforehand with such setting that it communicates with a terminal or an access point that communicates with another apparatus via it, at the security level "enc.1" or higher.

On the other hand, it is assumed that the terminal WL11 has the security levels "enc.0" and "enc.1", while the terminal WL12 has the security levels "enc.0", "enc.1", and "enc.2".

Figure 2:
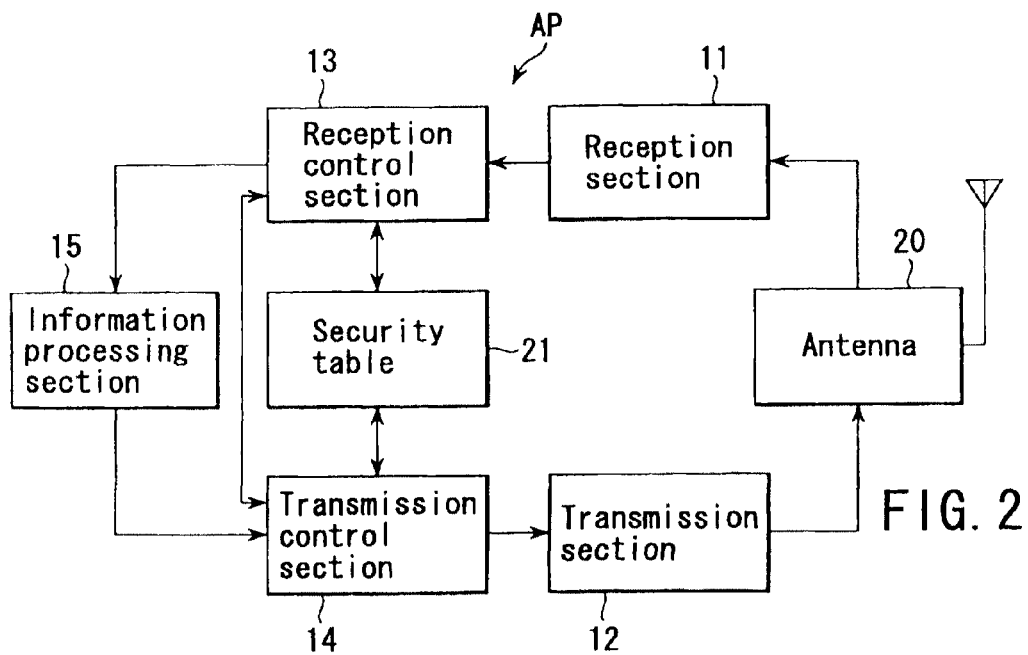
FIG. 2 is a block diagram of an example of a circuit configuration in an access point shown in FIG. 1.

FIG. 2 is a block diagram of a circuit configuration in the access point AP1 shown in FIG. 1. In the description given below, when it is not necessary to distinguish the access points AP1 and AP2 from each other or if the description is common to both access points AP1 and AP2, then they are simply called an "access point AP".

In FIG. 2, a reception section 11 receives transmitted signals from a terminal through an antenna 20 and executes processing including demodulation and decryption to generate received signals. A transmission section 12 generates transmitted signals to be transmitted to a terminal via the antenna 20. These transmitted signals are supplied to the antenna 20.

A received signal from the reception section 11 is input to a reception control section 13 and subjected to predetermined reception processing and the like conforming to the IEEE802.11 (in the description given below, the IEEE802.11 system includes an IEEE802.11a system, an IEEE802.11b system and future IEEE802.11 series). The reception control section 13 executes decryption processes each corresponding to one of the plurality of security levels supported by the access point. Thus, the received signal is decrypted into decrypted data. The decrypted data are supplied to an information processing section 15. The information processing section 15 divides the decrypted data into audio, text, and other types of data and executes required processing on these data.

A transmission control section 14 executes predetermined transmission processing and the like conforming to the IEEE802.11, such as broadcasting to terminals or generation of data for unicast transmissions. The transmission control section 14 executes, on data to be transmitted, encryption processes each corresponding to one of the plurality of security levels supported by the access point. Data generated by the transmission control section 14 is transmitted to a terminal via the transmission section 12 as a transmitted signal. A security table 21, shown in FIG. 2, will be described later.

Figure 3:
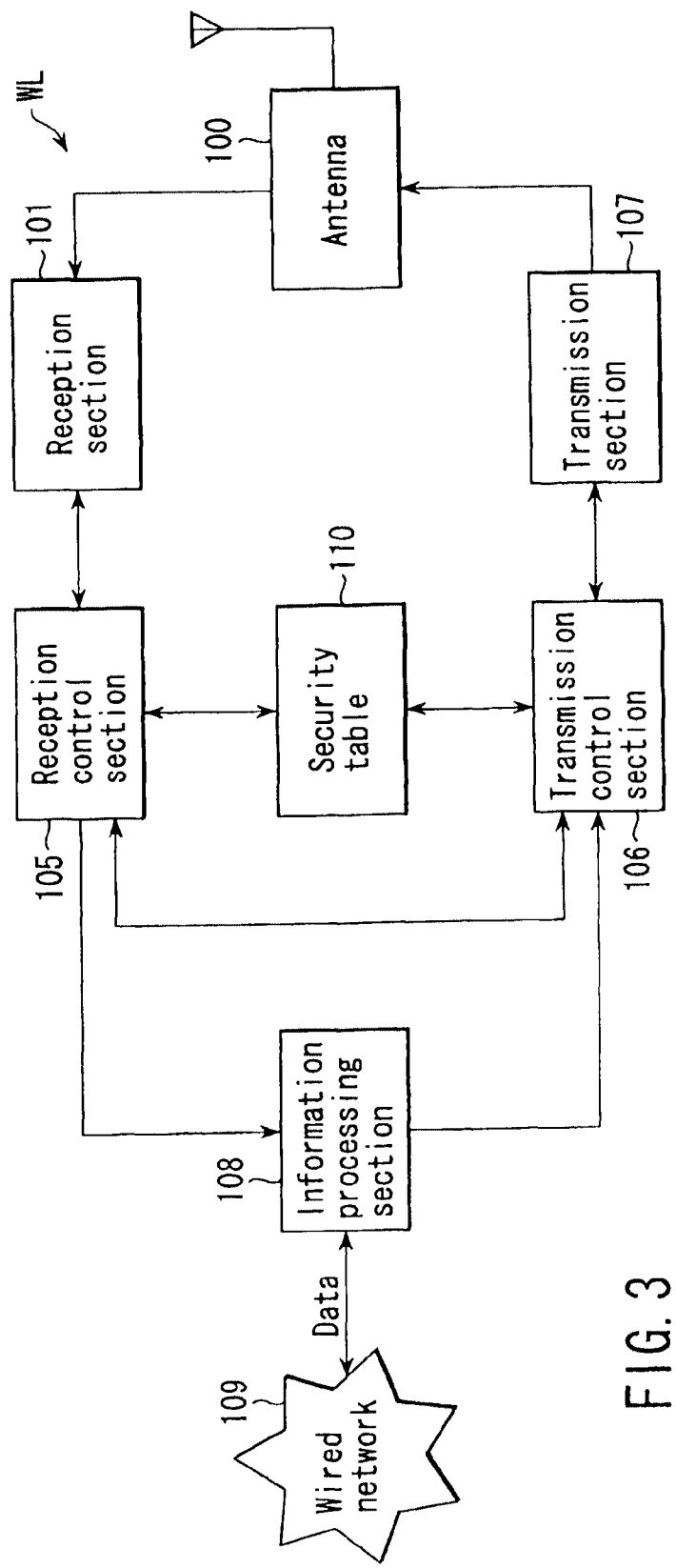
FIG. 3 is a block diagram showing an example of a circuit configuration in a wireless terminal shown in FIG. 1.

FIG. 3 is a schematic block diagram showing an example of an example of the circuit configuration of each of the terminals WL11, WL12, and WL13. In the description given below, when it is not necessary to distinguish the terminals WL11, WL12, and WL13 from each other or if the description is common to all of these terminals WL11, WL12, and WL13, then they are simply called a "terminal WL".

The terminal WL is composed of an antenna 100, a reception section 101 that receives received signals via the antenna 100, a reception control section 105 that controls the reception section 101, a transmission section 107 that transmits transmitted signals via the antenna 100, a transmission control section 106 that controls the transmission section 107, an information processing section 108 that generates data to be transmitted or processes received data, for example, causes the data to be displayed on a display section (not shown), and a security table 110.

The information processing section 108 receives data through a wired network 109 connected to the information processing section 108 or creates transmitted data on the basis of data generated by a user's operation. When a transmission request is issued by the user by instructing the transmitted data to be transmitted, the information processing section 108 receives the transmission request to pass it to the transmission section 107. The transmission section 107 converts the transmitted data into digital data specified in a standard, for example, converts an IP packet into a MAC frame (Medium Access Control frame) specified in the IEEE802.11. It further converts the MAC frame as digital data into a wireless signal of a predetermined frequency, e.g. 2.4 GHz. It then transmits the wireless signal from the antenna 100 as an electric wave.

On the other hand, a received signal received through the antenna 100 is converted into a MAC frame as digital data by the reception section 101. Received data are extracted from an information field in the MAC frame and transmitted to the information processing section 108. The information processing section 108 executes processing such as display of the received data on a display. The information processing section 108 may execute various information processes other than those described above. The security table 110 will be described later.

Figure 4:
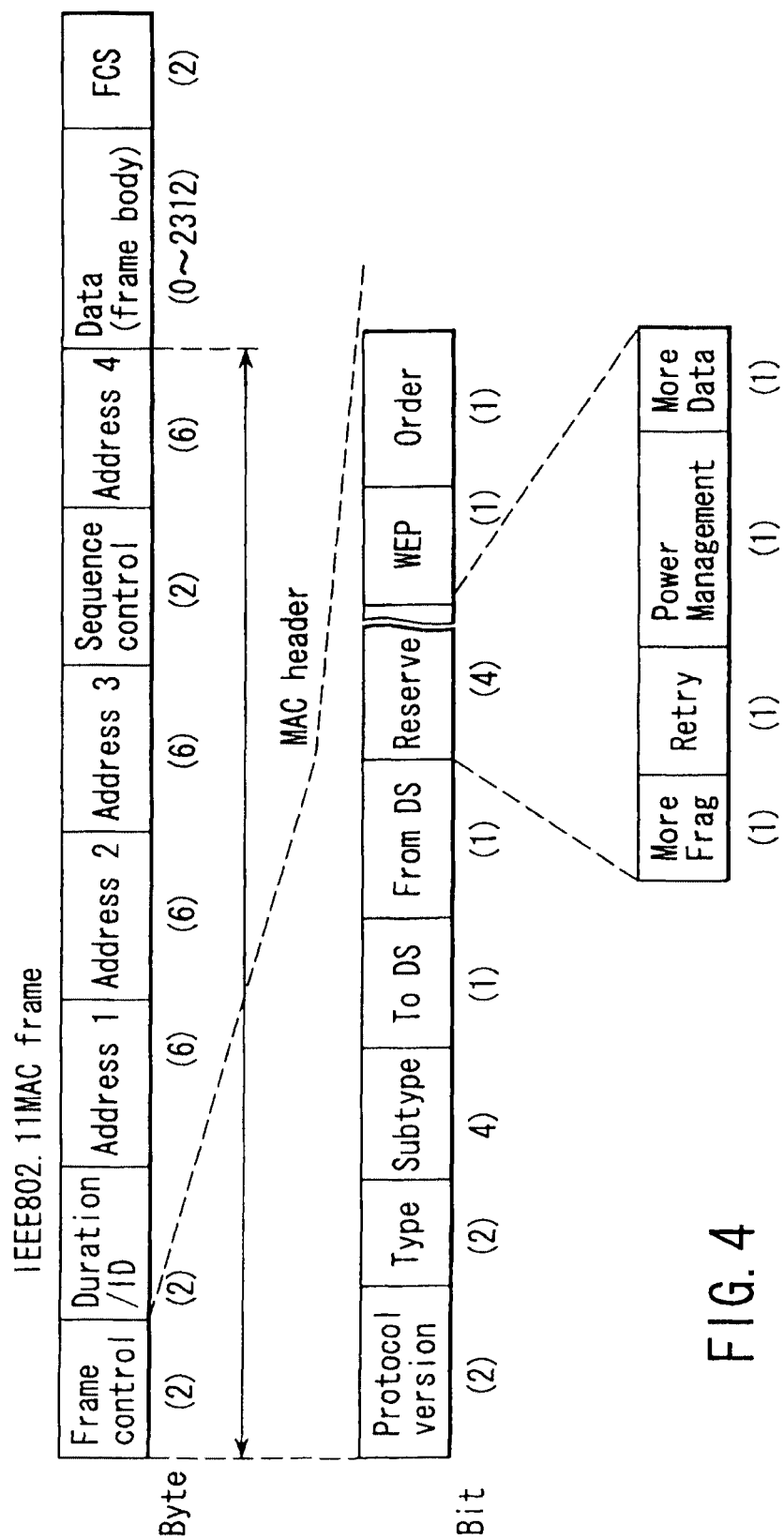
FIG. 4 is a schematic diagram showing the structure of a MAC frame specified in the IEEE802.11 and transferred between the access point and terminal in the communication system shown in FIG. 1.

The MAC frame specified in the IEEE802.11, as shown in FIG. 4, is composed of a MAC header that accommodates up to 30 bytes of various control information, a data field (frame body) that accommodates up to 2312 bytes of data, and a frame check sequence (FCS) field used to check whether or not the data have been transmitted correctly. The MAC header includes a frame control field that stores information required to control the MAC frame and a duration/ID field that describes a duration required before the terminal can start transmitting data or the ID of the terminal which is so called as an association ID in the IEEE802.11. If the BSS is provided with an access point AP, the MAC address of the access point AP is described as the ID of the BSS. Further, the MAC header is provided with fields for addresses 1 to 4 and a sequence control field. The addresses 1 to 4 is assigned as follows, for example, if a data frame is transmitted from an access point to another access point. The address 1 field describes the MAC address of a final destination within the communication system. The address 2 field describes the MAC address of a source within the communication system. The address 3 field describes the MAC address of a destination to which this MAC frame is directly transmitted. The address 4 field describes the MAC address of a source from which this MAC frame is directly transmitted.

The frame control field of the MAC frame is provided with a protocol version field that describes a protocol version, and a succeeding type and subtype fields. The MAC frame is classified into the three types described below and described in the type field (2 bits) of the frame control field. Further, the subtype of this type is indicated in a subtype (4 bits) field in further detail. That is, the MAC frame has the following three types: a (1) management frame, a (2) control frame used to control accesses, and a (3) data frame for data communication. The (1) management frame has the following subtypes: a beacon, an authentication frame, an association request frame, an association response frame and so on. Further, the (2) control frame has the following subtypes: ACK (Acknowledgement), RTS (Return To Send), CTS (Clear To Send), and so on. The subtype field (4 bits) indicates, in further detail, such a subtype in a particular type of MAC frame as described above.

The frame control field contains a To DS field (1 bit) and a From DS field (1 bit). These fields are used when the MAC frame contains data. In the other types of frames, e.g. an authentication frame or an association frame, "0" is always written to these fields, which are thus unused. When the MAC frame contains data, if the data are destined for a wired LAN, an access point, or a distribution system, a bit of 1 is described in the To DS field. On the other hand, if the data are transmitted by a wired LAN, an access point, or a distribution system, a bit of 1 is described in the From DS field. The frame control field is further provided with other fields such a reserved field, a WEP field, and an Order field. A user can write down information of its own use in the reserved field whose use is note yet particularly determined. Some of the field may be reserved according to the types and/or subtypes of frames, as shown in FIG. 4. However, in the present embodiments, an encryption level may be described in the reserved field as described later. The encryption level may be set according to the attribute of the transmitted data. If contents data, which require security, is to be transmitted, a high encryption level is set and described in the reserved field. The encryption level in the reserved field may be used when a handshaking operation is performed between the access point and the terminal. A bit of 1 is set in the WEP field if the WEP is to be used.

Referring back to FIG. 1, the BSS1 will be described.

The BSS1 shown in FIG. 1 is preset to communicate at the minimum security level (in this case "enc.1") preset for the BSS1. That is, the access point AP1 and each of the terminals WL11 and WL 12, constituting the BSS1, communicate with each other at the security level "enc.1" or at the security level "enc.1" or higher within the range of the security levels supported by the access point AP1.

The access point AP1 and terminals WL11 and WL12 are each provided with a storage section provided with a security table. The security table in the access point AP1 stores the security levels supported by the access point AP1, the minimum one of these security levels in the BSS1, and the security levels supported by each of the terminals WL11 and WL12. Further, preferably, the security table stores information required for encryption and decryption to encrypt and decrypt the security levels, such as an encryption key or seed information required to generate the encryption key (such information required for encryption and decryption is simply called "encryption parameters"). Further, the terminals WL11 and WL12 are each provided with a storage section that stores a security table. The security table stores the minimum one of the security levels supported by the BSS1, the security levels supported by the other terminals, the encryption parameters corresponding to the respective security levels, and the like.

As shown in FIG. 5, the security levels supported by the BSS1 to which the access point AP1 belongs and the security levels possessed by all terminals WL11 and WL12 which belong to the BSS1 are registered in the security table 21 of the access point AP1 beforehand together with the encryption parameters, data required to encrypt and decrypt the security levels. The security level set as the minimum level in the BSS1 to which the access point AP1 belongs is also registered in the security table 21 so as to be identifiable. FIG. 5, a circle indicating the minimum level is recorded for the security level "enc.1".

By way of example, for the WEP, the encryption parameters are assumed to be secrete keys (key 1 and key 2), an IV (Initialization Vector), and the like. In the description given below, the security levels and the encryption parameters corresponding to these security levels may be collectively referred to as "security information".

FIG. 6 shows the registered contents of the security table 110 in each of the terminals WL11 and WL12 in the BSS1. As shown in FIG. 1, the security information possessed by the terminals and access point AP1 in the BSS1 are registered in the terminal security table beforehand. The registered security information corresponding to the access point AP1 may be only the information on the minimum level preset for the BSS1 to which the access point AP1 belongs. Further, the terminal security table 110 may be exactly the same as the access point security table 21, shown in FIG. 5.

Further, the security levels of the access point and terminals registered in the security tables shown in FIGS. 5 and 6 have only to be equal to or higher than the minimum level set for the BSS1. Furthermore, the registered security information corresponding to each terminal may be only the security levels used for actual communication within the BSS. That is, the respective terminals can hold one of the security information in respect to the access point or can hold the security information in respect to the terminal, which can be supported by the terminal in the BSS, on the security table of the terminal, if the respective terminals are directly liked to the access point.

Moreover, the security tables shown in FIGS. 5 and 6 are set while the BSS1 is being initialized. During initialization, for example, tables in the forms shown in FIGS. 5 and 6 may be displayed as a setting screen so that setting items can be input to this screen. In the tables shown in FIGS. 5 and 6, the AP1, WL11, and WL12 are identified by the MAC addresses of the access point AP1 and terminals WL11 and WL12.

In addition, the security tables shown in FIGS. 5 and 6 may have no information at the initialization. Thus, the access point AP1 and terminals WL11 and WL12 may be liked in the non encryption mode in a manner as described later with reference to FIG. 7 and the access point AP1 and terminals WL11 and WL12 may acquire corresponding security information in respect to the access point AP1 and terminals WL11 and WL12 and describe the security information on the corresponding security tables. Thereafter, the BSS1 may be set by the access point AP1 and terminals WL11 and WL12 and a minimum security level may be set.

In the BSS1 shown in FIG. 1, the access point AP1 and the terminals WL11 and WL12 communicate with each other at a security level equal to or higher than "enc.1", the minimum security level preset for the BSS1.

Now, with reference to the flow chart shown in FIG. 7, description will be given of the case in which the terminal WL13, which is not subscribed to the BSS1, is to be connected to the access point ASP in the BSS1 shown in FIG. 1.

The terminal WL13 receives a beacon frame specified in the IEEE802.11 and transmitted from the access point AP1. According to the specification of the IEEE802.11, the beacon frame is received and then an authentication and association procedures are followed. The security levels of the terminal WL13 are written in the authentication or association frame as information communicated to the access point AP1.

Figure 7:
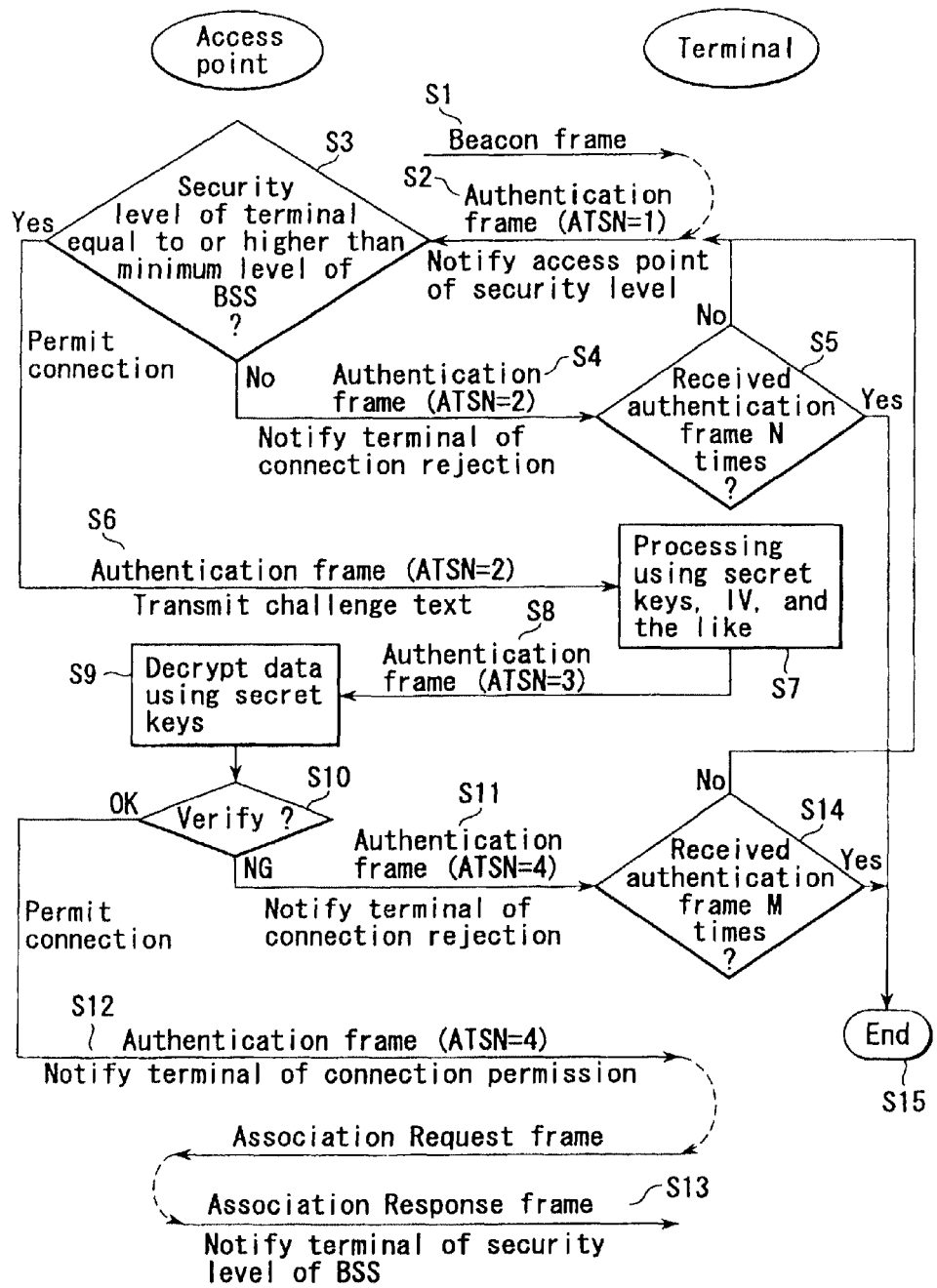
FIG. 7 is a flow chart illustrating an example of process operations performed by the access point and terminal in the communication system shown in FIG. 1.

FIG. 7 shows by way of example a procedure used if the access point AP1 is notified of the security level of the terminal WL13 using an authentication frame. It is assumed that, in this procedure, the security levels of the terminal WL13 are "enc.0" and "enc.1".

FIG. 8A shows the format of a frame body in an authentication frame as the MAC frame shown in FIG. 4 and specified in the IEEE802.11. An authentication algorithm is described in the authentication frame and distinguishes an open system that does not use a common encryption key from a common encryption key system that uses the common encryption key. An authentication algorithm number is described, for example, as "0" for the open system and as "1" for the common encryption key system. For the open system, identified by the authentication algorithm number 0, frames with authentication translation sequence numbers (ATSN) 1 and 2 are provided as authentication request frames as shown in FIG. 8B. The authentication frame with ATSN=1 is sent from the terminal WL to the access point AP1, with its status code field set to be reserved. The authentication frame with ATSN=2 is sent from the access point AP1 to the terminal WL. In the status code field of this frame, a code indicative of connection rejection or permission is described as a status. For the open system, identified by the authentication algorithm number 0, the authentication frame is not provided with any challenge texts to be encrypted. For the common encryption key system, frames with authentication translation sequence numbers (ATSN) 1 to 4 are provided as authentication request frames. The authentication frames with ATSN=1 and 3 are sent from the terminal WL to the access point AP1, with its status code field set to be reserved. The authentication frames with ATSN=2 and 4 are sent from the access point AP1 to the terminal WL. In the status code field of this frame, a code indicative of connection rejection or permission is described as a status. For the common encryption system, the authentication frames with ATSN=2 and 3 are provided with a challenge text, and the authentication frame with ATSN=3 is encrypted. In contrast, the authentication frames with ATSN=1 and 4 are not provided with any challenge texts to be encrypted.

The authentication frame identified by ATSN=1 is transmitted by a connection request sender. In this request frame, the status code field is set to be reserved and is currently unused. Accordingly, the security level "enc.1" or "enc.2", supported by the connection request sender, can be written in this status code field. In the following description of the embodiments, it is assumed that the security level "enc.1" or "enc.2", supported by the connection request sender, has been written in this field. In the authentication frame with ATSN=1, data are written in the status code field, the data indicating a security level (for example, "enc.1") desirably used by the transmission section 107 of the terminal WL13 to communicate with the access point AP1. This authentication frame with ATSN=1 is transmitted to the access point AP1 as shown by step S2 in FIG. 7. This security level may be written in either of the other reserve fields of the MAC frame shown in FIG. 4.

Description will be given of process operations performed by the access point AP1 upon receiving an authentication frame ATSN=1. As already described, a beacon frame always issued by the access point AP1 is detected by the terminal WL13 as shown in step S1. After the detection, the transmission control section 106 of the terminal WL13 prepares an authentication frame with ATSN=1 and refers to the security table 110 to write the security level "enc.1" or "enc.2" in a predetermined part of the frame, e.g. the status code field of the frame body. The authentication frame in which the security level has been written is transmitted to the access point AP1 as shown in step S2, with the access point AP1 specified in an address 2 field as a destination, the access point corresponding to the beacon frame detected by the transmission control section 106 of the terminal WL13. The access point AP1 receives the authentication frame. The reception control section 13 of the access point AP1 retrieves the security level "enc.1" or "enc.2" of the terminal WL13 written in the in the predetermined part of the frame, e.g. the status code field of the frame body. The reception control section 13 then compares this security level with the minimum security level "enc_low" in the BSS1 registered in the security level 21 of the access point AP1. As shown in step S3, a connection to the terminal WL13 is determined to be permitted if the security level "enc.1" or "enc.2" communicated by the terminal WL13 is the same as the security level "enc.1" or "enc.2" supported by the access point AP1 and is equal to or higher than the minimum level "enc_low" in the BSS1. A connection to the terminal WL13 is determined to be rejected if the security level of the terminal WL13 is not supported by the access point AP1 or if the security level of the terminal WL13 is supported by the access point AP1 but is lower than the minimum level "enc_low" in the BSS1.

In step S3, if the access points AP1 rejects its connection to the terminal WL13, then according to the specification of the IEEE802.11, the transmission control section 12 prepares an authentication frame with ATSN=2 and writes a code in the status code field, indicating that connection has failed. Then, as shown in step S4, an authentication frame with ATSN=2 is returned to the terminal WL13. Then, as shown in step S5, the terminal WL13 determines whether or not it has received an authentication frame with ATSN=2 with a description of a connection rejection N times. The number N corresponds to the number of securities (=N) written in the terminal security table 110. Initially, the terminal WL13 determines that the security level supported by the access point AP1 is low and notifies the access point AP1 of its low security level. If connection is rejected, then the terminal WL13 raises the security level and notifies the access point AP1 of the raised level as shown in step S2. If the terminal WL13 has notified the access point AP1 of the N security levels supported by the terminal security table 110 and has received an authentication frame with ATSN=2 N times as shown in step S5, then the terminal WL13 determines that the access point AP1 has rejected its connection. The terminal WL13 then halts the connection procedure as shown in step S15.

On the other hand, if the access point AP1 permits connection, it executes the step described below in order to share encryption parameters with the terminal WL13 which correspond to the security level communicated by the terminal WL13. That is, as shown in step S6, according to the specification of the IEEE802.11, the access point AP1 prepares an authentication frame with ATSN=2 used to transmit challenge text, and writes a code in the status code field of this authentication frame, indicating that the authentication frame with ATSN=1 has been received successfully. The access point AP1 then returns the frame to the terminal WL13 as shown in step S6.

Upon receiving the authentication frame with ATSN=2, the WL13 establishes the security level between the access point AP1 and the terminal WL13, e.g. the security level "enc.1". Further, the terminal WL13 uses, as encryption parameters corresponding to the security level, an IV and secret keys already obtained by the user to encrypt the frame body containing the challenge text and the like, according to the specification of the IEEE802.11, using the WEP function of the terminal WL13, as shown in step S7. Furthermore, the terminal WL13 prepares an authentication frame with ATSN=3, and copies the challenge text from the authentication frame with ATSN=2 in the frame body of this frame. The terminal WL13 then transmits the frame after encryption to the access point AP1 as shown in step S8.

Upon receiving the authentication frame with ATSN=3, the access point AP1 decrypts the encrypted frame and extracts the challenge text stored in the received authentication frame with ATSN=3, also according to the specification of the IEEE802.11, using the secret keys possessed by the access point AP1 and shared by the terminal WL13, as shown in step S9. The access point AP1 then compares the decrypted challenge text with the transmitted one to verify encryption and decryption on the basis of the result of the comparison.

If the result of the verification is a "failure", then, also according to the IEEE802.11, the access point AP1 prepares an authentication frame with ATSN=4 indicating that the result of the verification is a "failure" and writes a code in the status code field, indicating that the result of the verification is a "failure". The access point AP1 then returns the authentication frame with ATSN=4 to the terminal WL13 as shown in step S11. The verification result "failure" means that the access point AP1 and the terminal WL13 use different encryption methods. Accordingly, the terminal WL13 confirms that it has received an authentication frame with ATSN=4 M times or less, and then changes its encryption method. The procedure then returns to step S2 to repeat steps S2 to S10. In this case, the number M corresponds to the number of encryption methods prepared by the terminal WL13. The terminal WL13 can receive an authentication frame with ATSN=4 M times. If the encryption methods are not matched after the terminal WL13 has thus received an authentication frame with ATSN=4 M times, then the terminal WL13 determines that its connection with the access point AP1 has been rejected. Accordingly, it is determined that the terminal WL13 is not provided with the encryption method provided by the access point AP1. Then, the connection procedure is ended as shown in step S15.

On the other hand, if the result of the verification is a "success" in step S10, then according to the specification of the IEEE802.11, the access point AP1 transmits an authentication frame with ATSN=4 to the terminal WL13, the frame indicating that the result of the verification is a "success". Upon receiving this frame, the terminal WL13 starts the association specified in the IEEE802.11, the next procedure, as shown in step S12. That is, the terminal WL13 sends an association request frame to the access point AP1 to the access point AP1 as shown in step S13. In response to this request, the access point AP1 executes such a process operation as returns an association response to the terminal WL13 according to the specification of the IEEE802.11. Once the association has been completed correctly, a data frame is transmitted between the terminal WL13 and the access point AP1. The transmitted data frame is encrypted by the preset encrypting function, for example, the 64-bit WEP function, which corresponds to the security level "enc.1=enc. low".

Once the security level and encryption parameters are established for communication between the terminal WL13 and the access point AP1, the security information on the terminal WL13 and access point AP1 is registered in the security tables 21 and 110, respectively. That is, after the terminal WL13 has obtained encryption parameters in step S7, shown in FIG. 7, the security information on the access point AP1 is registered in the security table 110 of the terminal WL13. On the other hand, after the access point AP1 has achieved verification successfully in step S10, shown in FIG. 7, the security information on the terminal WL13 is registered in the security table 21 of the access point AP1. That is, by selecting the proper address field which indicates the address of the terminal WL13 in the MAC frame shown in FIG. 4, the security information relating to this address 2 is registered in the security table 21 of the access point AP1. Security information indicating the terminal WL13 as a "connection target" is newly registered in the security table of the access point AP1. Likewise, security information indicating the access point AP1 as a "connection target" is newly registered in the security table of the terminal WL13. That is, by selecting the proper address field which indicates the address of the terminal WL13 in the MAC frame shown in FIG. 4, the security information relating to this address 2 is registered in the security table 110 of the terminal WL13. The security level in the security information newly added to the terminal WL13 corresponds to the one requested by the terminal WL13 in step S2, shown in FIG. 7.

Further, provided that the security information on the access point is registered in the terminal security table, the terminal can select a security level equal to, or higher than the minimum level of the access point in advance. This prevents the access point from rejecting its connection in step S3. In this case, the security information on the access point contains a security level at least equal to or higher than the minimum level set for the BSS to which the access point belongs. In other words, when the terminal reconnects to the access point, it may select one of the security levels supported by itself which is equal to or higher than the minimum level set for the access point, and may notify the access point of this security level as shown in step S2, shown in FIG. 7.

Further, preferably, the security information registered in the security table of the access point AP1 has a security level at least equal to or higher than the minimum level enc_low preset for the BSS to which the access point belongs. For the BSS to which the access point belongs, the address 1 described in the proper address field identifies the BSS, so that, in this registration, this address and related security level are described in the security table. Such registration relating to the BSS makes it possible to select beforehand a security level which is equal to or higher than the minimum level and which can be supported by the terminal, as one used for unicast communication from the access point to the terminal. Further, it is possible to select beforehand a security level which is equal to or higher than the minimum level enc_low and which is supported by all terminals that receive the communication, as one used for multicast or broadcast communication with the terminal WL in the BSS to which the access point AP belongs. That is, as shown in step S5 in FIG. 7, if the access point AP1 rejects connection, the terminal WL can issue a connection request again by notifying the access point of a security level that is different from and preferably higher than the previously communicated one. The terminal WL13 can request connection up to a maximum predetermined number of times M by notifying the access point of the security levels of the terminal WL13 one by one.

The access point AP1 may notify the terminal WL13, a connection requester, of the minimum security level enc_low preset for the BSS or all security levels which are equal to or higher than the minimum level enc_low and which are supported by the access point AP1. This notification may be carried out using one of the management and control frames which is currently unused, the management and control frames belonging to the MAC frame specified in the IEEE802.11. For example, it is possible to use a management frame with a subtype of "0110" to "0111" or the like, or a control frame with a subtype of "0000" to "1001" or the like. In step S4, shown in FIG. 7, if the access point AP1 rejects its connection to the terminal WL13, the former may transmit an authentication frame with ATSN=2 and then transmit the above unused frame to notify the terminal WL13 of all security levels equal to or higher than the minimum level enc_low. Alternatively, in step S4 or step S6, the access point AP1 may transmit the above unused frame to notify the terminal WL13 of all security levels equal to or higher than the minimum level enc_low before transmitting an authentication frame with ATSN=2. Alternatively, the access point AP1 may transmit the unused frame to notify the terminal WL13 of all security levels equal to or higher than the minimum level enc_low at any appropriate time, e.g. during an authentication or association process or before the transmission of a data frame is started.

In the association frame belonging to the MAC frame specified in the IEEE 802.11, a reserved field is provided in the "Capability information" field of its frame body as an unused area, as shown in FIGS. 9A and 9B. The access point AP1 may use this unused area to notify the terminal WL13, the connection requester, of the minimum security level in the BSS1 or all security levels which are equal to or higher than the minimum level enc_low and which are supported by the access point AP1.

Thus, in the first embodiment, if an attempt to connect to the access point AP1 is made by the terminal WL13, which does not belong to the BSS1 and is different from the WL11 and WL12, which belong to the BSS1, the following operations are performed:

(1) First, the terminal WL13 notifies the access point AP1 of its own security level. In the flow shown in FIG. 7, this notification is carried out using an authentication frame.

(2) If the security level notified by the terminal WL13 is supported by the access point AP1 and is equal to or higher than the minimum level enc_low preset for the BSS1, then the access point permits its connection to the terminal WL13 and continues process operations required for the connection. However, if the security level notified by the terminal WL13 is lower than the minimum level preset for the BSS1, the access point rejects its connection to the terminal WL13.

(3) If the access point permits its connection to the terminal WL13, it executes a recognition process to share information required for encryption and decryption, i.e. encryption parameters.

Thus, according to the first embodiment, wireless communication is actualized which ensures the preset encryption-based minimum security level for each basic group of the wireless LAN such as the BSS.

Preferably, in the case of (1), the number of rejections, by the access point AP1, of a connection to the terminal WL13 is reduced provided that the terminal WL13 notifies the access point AP1 of the maximum enc_high of the security levels supported by itself. Further, if the terminal WL13 notifies the access point AP1 of the maximum level enc_high, a single connection request allows the access point AP1 to determine whether or not to permit connection. This reduces useless traffic.

Further, the access point or each terminal within the BSS1 preferably registers, in its security table, security information containing security levels which are equal to or higher than the minimum level enc_low preset for the BSS1 and which are used when the access point or each terminal communicates with other access points or terminals within the BSS1. The access point or each terminal can refer to this security table to select a minimum security level that prevents connection from being rejected, as one communicated when the access point or each terminal issues a connection request to a desired terminal or access point identified by the corresponding address.

In the above described first embodiment, in step S2, the terminal WL13 notifies the access point AP1 of only one security level that it desires to use for communication with the access point AP1. Obviously, however, the present invention is not limited to this aspect. For example, the terminal WL13 may notify the access point AP1 of all security levels possessed by the terminal WL13 or not all but a plurality of security levels. Further, the terminal WL13 may notify the access point AP1 of only the maximum one enc_high of the security levels supported by the terminal WL13.

Description will be given of process operations performed by the access point AP1 if the terminal WL13 notifies the access point AP1 of all security levels possessed by the terminal WL13 or not all but a plurality of security levels.

In step S2, shown in FIG. 7, a plurality of security levels possessed by the terminal WL13 are transmitted to the access point AP1. In step S3, the access point AP1 determines whether or not any of these security levels are equal to or higher than the security level enc_low, corresponding to the minimum level in the BSS1, and are supported by itself. If any of these security levels are supported by the access point AP1, it determines to permit its connection to the terminal WL13. On the other hand, if none of the security levels are supported by the access point AP1, it determines to reject its connection to the terminal WL13. If the access point AP1 rejects its connection to the terminal WL13, it proceeds to step S4. If a connection to the terminal WL13 is permitted, the access point AP1 selects one of the security levels supported by both terminal WL13 and access point AP1 which is equal to or higher than the minimum level enc_low in the BSS1. If a plurality of security levels are equal to or higher than the minimum level enc_low in the BSS1, the access point AP1 selects one of them. In this case, various selection criteria may be used; the lowest or highest one or another of these security levels may be selected. In any case, it is only necessary to select one of them. The access point AP1 sets the selected one security level to be used for communication with the terminal WL13. If, for example, the terminal WL13 notifies the access point of the security levels "enc.0" and "enc.1", then it is permitted to be connected to the access point AP1. Further, the security level "enc.1" is selected for the communication between the terminal WL13 and the access point AP1.

If the access point must notify the terminal WL13 of this selected security level, then for example, in step S6, in FIG. 7, it may carry this out before transmitting an authentication frame with ATSN=2 or at another time using one of the management and control frames which is currently unused, the management and control frames belonging to the MAC frame specified in the IEEE802.11.

In response to the notification of the selected security level, the terminal WL13 can prepare for the subsequent processing.

The communication within the BSS1 does not necessarily require the same security level provided that the security level used is equal to or higher than the minimum level enc_low preset for the BSS1.

Further, within the BSS1, communication may be carried out using different security levels depending on connection targets. That is, as long as the security levels used are equal to or higher than the minimum level enc_low preset for the BSS1, the access point AP1 is not expressly limited in the security level used or the terminal with which it communicates. The secrecy of wireless communication is improved when the access point AP1 carries out communication using different security levels for the respective terminals.

In the description of FIG. 7, the operations are performed to establish a connection between the terminal WL13, which is not subscribed to the BSS1, and the access point AP1. However, in the above description, the terminal WL13 may be replaced with the terminal WL11 or WL12, which is subscribed to the BSS1. When the terminal WL11 or WL12 attempts to connect to the access point AP1, it can also notify the access point AP1 of different security levels one by one in step S2, shown in FIG. 7, if the procedure shown in FIG. 7 is followed. Then, for each connection, the terminal can change the security level depending on the purpose of the connection. In this case, since the minimum security level of the BSS1 is registered in the security table of each terminal, the terminal selects one of the security levels supported by itself which is equal to or higher than the minimum level. Then, in step S2, the terminal notifies the access point AP1 of the selected security level. Alternatively, even if the security level is not changed, the encryption parameters (in the case of the WEP, the secret keys, IV, and the like) can be changed during the subsequent authentication.

Likewise, the procedure used by the terminal to issue a connection request to the access point is also applicable when an access point belonging to a BSS issues a connection request to a different access point belonging to a different BSS. That is, the terminal WL13 in the description of FIG. 7 can be replaced with the access point AP1. Further, the access point AP2 can be replaced with an access point belonging to a BSS different from the BSS1, for example, in this case, an access point AP2 in the BSS2. Thus, according to the first embodiment, even communication between access points, i.e. DS communication is realized at a security level equal to or higher than the minimum level of each access point.

When a terminal within the BSS1, e.g. the terminal WL11 communicates with another terminal within the BSS1, e.g. the terminal WL12, these terminals may always connect to the access point AP1 and communicate with each other via the access point AP1 or may communicate directly with each other without using the access point AP1.

If the terminals WL11 and WL12 and the access point AP1 attempt to connect to their targets registered in their security tables, it is possible to omit authentication or the like required to transmit and receive the security level and the encryption parameters. If the frame sender is registered in the security table of the connection request receiver, the latter refers to the security table and communicate with the requester at a security level equal to or higher than the minimum level preset for the BSS1.

The security tables of the access point AP1 and the terminals WL11 and WL12 may contain only security information which is registered for each of their connection targets and which contains security levels used for the past communications between them. The registered security information corresponds to security levels equal to or higher than the minimum level enc_low in the BSS1.

During initialization, the same contents may be described in all of the security tables of the access point AP1 and terminals WL11 and WL12 in the BSS1. That is, these security tables may contain, as registered information, security information containing all security levels supported by each of the apparatuses constituting the BSS1 as well as a security level set for the BSS1 as the minimum level, as shown in FIG. 5.

Further, within the BSS1, the access point AP1 and the terminals WL11 and WL12 also support the minimum permissible security level "enc.1" in the BSS1. Accordingly, when the terminal WL11 or WL12 multicasts or broadcasts a data frame or the like within the BSS1, the frame body of this frame is encrypted with the minimum permissible security level. This enables the BSS1 to ensure the minimum permissible security level.

Further, the above described first embodiment simultaneously executes the following two processes during the authentication specified in the IEEE802.11: the check on the security levels supported by the connection request sender and the recognition process required to allow the connection request sender and the connection target to share the encryption parameters. However, these two processes can be executed during separate periods; the former can be executed during the association specified in the IEEE802.11. Alternatively, it is contemplated that the association may be carried out before the authentication. In this case, the above two processes may both be executed during the authentication or may each be executed during the association or authentication. However, if the above two processes are executed during separate periods, security is more preferably ensured by carrying out the check on the security levels before the recognition process required to allow the encryption parameters to be shared.

Second Embodiment

Figure 12:
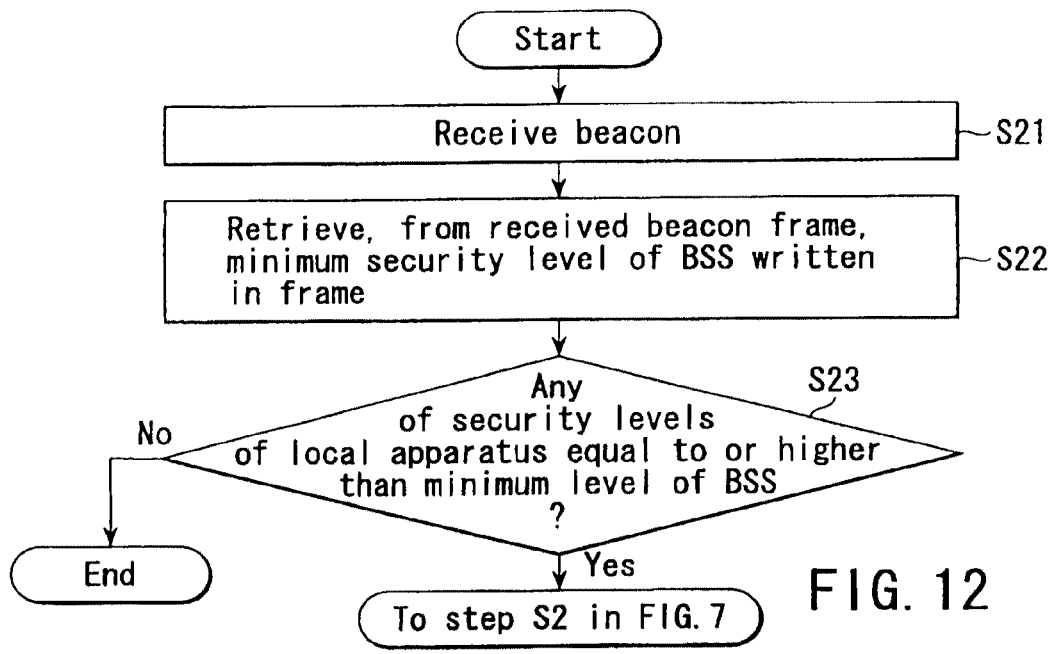
FIG. 12 is a flow chart showing a process procedure in which the access point in the communication system shown in FIG. 1 notifies the terminal in the same communication system of a minimum security level preset for a BSS to which the access point belongs and in which the terminal transmits a connection request to the access point.

Description will be given of a communication system according to a second embodiment in which an access point within a BSS1 such as that shown in FIG. 1 for which the minimum security level is preset broadcasts the minimum security level set for the BSS1. In this description, for the communication system according to the second embodiment, the same contents as those of the first embodiment are omitted. With reference to FIG. 12, description will be given of those points which are different from the corresponding points of the first embodiment.

In the communication system according to the second embodiment, the minimum security level of the BSS is written in the beacon frame specified in the IEEE802.11. Then, this beacon frame is transmitted.

Figures 10, 11:
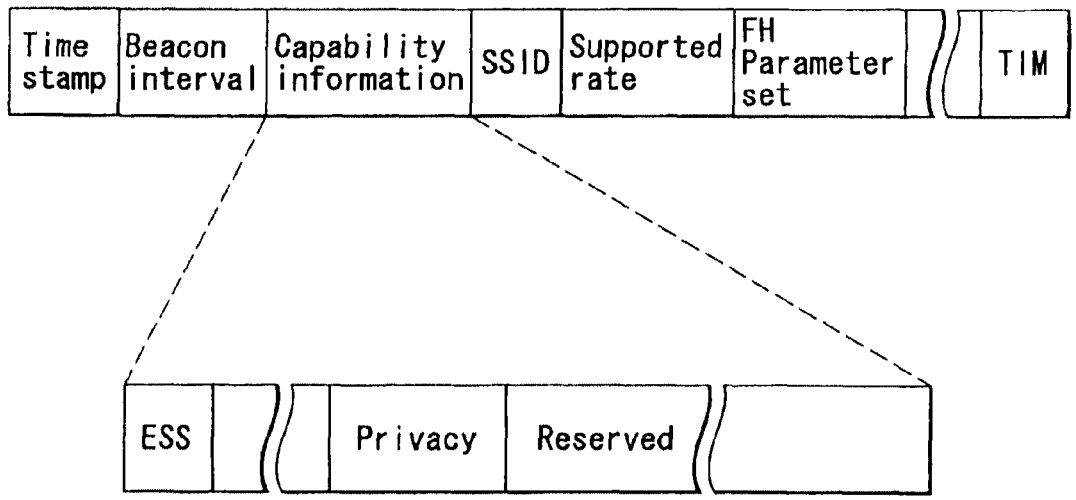
FIG. 10 is a table showing a specific example of the updated security table provided in the access point or terminal in the communication system shown in FIG. 1.
FIG. 11 is a schematic diagram showing structure of a beacon frame specified in the IEEE802.11 and transmitted from the access point to the terminal in the communication system shown in FIG. 1.

FIG. 11 shows the format of a frame body of a beacon frame having the structure of the MAC frame specified in the IEEE802.11. The beacon frame has a reserved field in its "Capability information" field as an unused area. The access point AP1 writes, in this reserved field, the minimum security level of the BSS1 or all security levels which are equal to or higher than the minimum level and which are supported by the access point AP1 or not all but a plurality of such security levels. Further, the access point AP1 notifies the security level(s) to the terminals WLS.

The transmission control section 14 of the access point AP1 writes, in a beacon frame, the minimum security level of the BSS1 or all security levels which are equal to or higher than the minimum level and which are supported by the access point AP1 or not all but a plurality of such security levels. Further, the transmission control section 14 broadcasts this beacon frame. As shown in step S21, shown in FIG. 12, the terminals receive this beacon frame. The beacon frame can be received by a terminal that is not subscribed to the BSS1, e.g. the terminal WL13, shown in FIG. 1.

The reception section 101 of the terminal WL13 retrieves the minimum security level of the BSS1 written in the received beacon frame, as shown in step S22. The reception section 101 then checks whether any of the security levels supported by the terminal WL13 are equal to or higher than the minimum level of the BSS1. In this case, all security levels supported by the terminal WL13 may be registered in the security table of the WL13 beforehand. If none of the security levels of the terminal WL13 are equal to or higher than the minimum level of the BSS1, the terminal WL13 resigns its connection to the access point A and ends this connection process.

In this case, the minimum security level of the BSS1 is "enc.1", and the terminal WL13 supports "enc.0" and "enc.1". Accordingly, the terminal WL13 can be connected to the access point AP1. The terminal WL13 has a security level equal to or higher than the minimum level of the BSS1. Thus, the terminal WL13 selects this security level "enc.1" to start issuing a connection request to the access point AP1. That is, the terminal WL13 proceeds to step S2 in FIG. 7 to notify the access point AP1 of the selected security level. Subsequently, operations are performed which are similar to those in the description of the first embodiment.

In this case, however, it is always expected that the terminal WL notifies the access point AP1 of a security level equal to or higher than the minimum level. Consequently, step S3 for the access point SP1, shown in FIG. 7, may be omitted. Alternatively, in step S2, the terminal WL13 may select one of the security levels possessed by itself which is equal to or higher than the minimum level of the BSS1, notified by the beacon frame (if there are a plurality of such security levels, it is possible to select all, some, or one of them, e.g. the highest, lowest, or desired one of them), and notifies the access point AP1 of the selected security level.

Thus, the access point AP1 in the BSS1, for which the minimum security level is preset, broadcasts the minimum security level of the BSS. Consequently, the terminal WL13 selects a target to which it can connect at a security level supported by itself, before starting a connection. This reduces useless traffic.

Alternatively, the terminal WL13 can transmit a probe request frame to the access point AP1 so that the access point AP1 notifies the terminal WL13 of a security level using a probe response frame.

Third Embodiment

In the above description of the first embodiment, the authentication and association specified in the IEEE802.11 are carried out in this order. However, it is contemplated that the association may precede the authentication. In the third embodiment, this case will be described taking the BSS1, shown in FIG. 1, by way of example, with reference to the flow chart shown in FIG. 13.

The terminal WL13 receives a beacon frame transmitted by the access point AP1 as shown in step S31. Then, to connect to the access point AP1, the terminal WL13 transmits an association request frame to the access point AP1 as shown in step S32.

As described previously, in the association frame belonging to the MAC frame specified in the IEEE 802.11, the unused area, i.e. the reserved field is provided in the "Capability information" field of its frame body as shown in FIGS. 9A and 9B. The transmission section 107 of the terminal WL13 writes at least a desired one of the security levels supported by the terminal WL13, in this reserved field. The transmission section 107 then transmits this frame to the access point AP1. For example, it is assumed that the transmission section 107 of the terminal WL13 writes one of all security levels ("enc.0" and "enc.1") possessed by the terminal WL13, "enc.1", in the reserved field and then transmits the frame to the access point AP1.

Upon receiving this frame, the access point AP1 performs process operations similar to those in the first embodiment. That is, the reception control section 13 of the access point AP1 retrieves the security level of the terminal WL13 written in the association request frame. The reception control section 13 then compares this security level with the minimum security level of the BSS1 registered in the security table 21 of the access point AP1. If the security level of the terminal WL13 communicated by it is supported by the access point AP1 and is equal to or higher than the minimum level in the BSS1, then the access point AP1 determines to permit its connection to the terminal WL13 as shown in step S33. On the other hand, if the security level is lower than the minimum level of the BSS1, the access point AP1 determines to reject its connection to the terminal WL13 as shown in step S33. That is, if the access point AP1 rejects its connection to the terminal WL13, then for example, according to the specification of the IEEE802.11, it writes a code in a status code field of an association response frame, indicating that connection has failed, and then returns the frame to the terminal WL13, as shown in step S34. Upon receiving this frame, the terminal WL13 determines that the access point AP1 rejects connection and halts the connection procedure.

On the other hand, if the access point AP1 permits its connection to the terminal WL13, it performs the operations described below to carry out communication using the minimum security level "enc.1" of the BSS1 communicated by the terminal WL13. That is, according to the specification of the IEEE802.11, the access point AP1 writes a code in the status code field of the association response frame, indicating that connection has succeeded, and then transmits this frame to the terminal WL13 as shown in step S36.

Upon receiving this frame, the terminal L13 transmits an authentication frame as shown in step S37 in order to allow the terminal WL13 and the access point AP1 to share encryption parameters, according to the specification of the IEEE802.11. After transmitted, the authentication frame is processed according to the specification of the IEEE802.11. This processing conforms to the IEEE802.11, and thus its description is omitted.

Of course, the third embodiment is expected to produce effects similar to those of the first embodiment. Further, many variations of the third embodiment are possible as described in the first embodiment.

Fourth Embodiment

Now, taking by way of example the wireless LAN system shown in FIG. 1, description will be given of a method used if a certain terminal communicates while moving through the areas of a plurality of access points, to ensure a security level for each of these areas, i.e. for each BSS. In the fourth embodiment, description will be given of a method of ensuring the minimum security level preset for each BSS to which the corresponding access points belong, even in the situation in which the terminal WL is moved, i.e. in a so-called mobile environment. Essentially, as described in the first embodiment, when an access point in each BSS receives a connection request from a terminal, the terminal notifies the access point of its security level. The access point permits its connection to the terminal only if the communicated security level is equal to or higher than the minimum level set for its BSS. The access point then executes the authentication process to allow the access point and the terminal to share the encryption parameters.

For example, in the wireless LAN system specified in the IEEE802.11, if the terminal WL13 in FIG. 1, connected to the access point AP2, moves into the area of the access point AP1, reassociation is carried out between the terminal WL13 and the access point AP1. Then, once this reassociation procedure is completed correctly, data frames are transmitted.

In the fourth embodiment, the terminal WL13 notifies the access point AP1 of its security levels using an unused area in a reassociation request frame.

Figure 13:
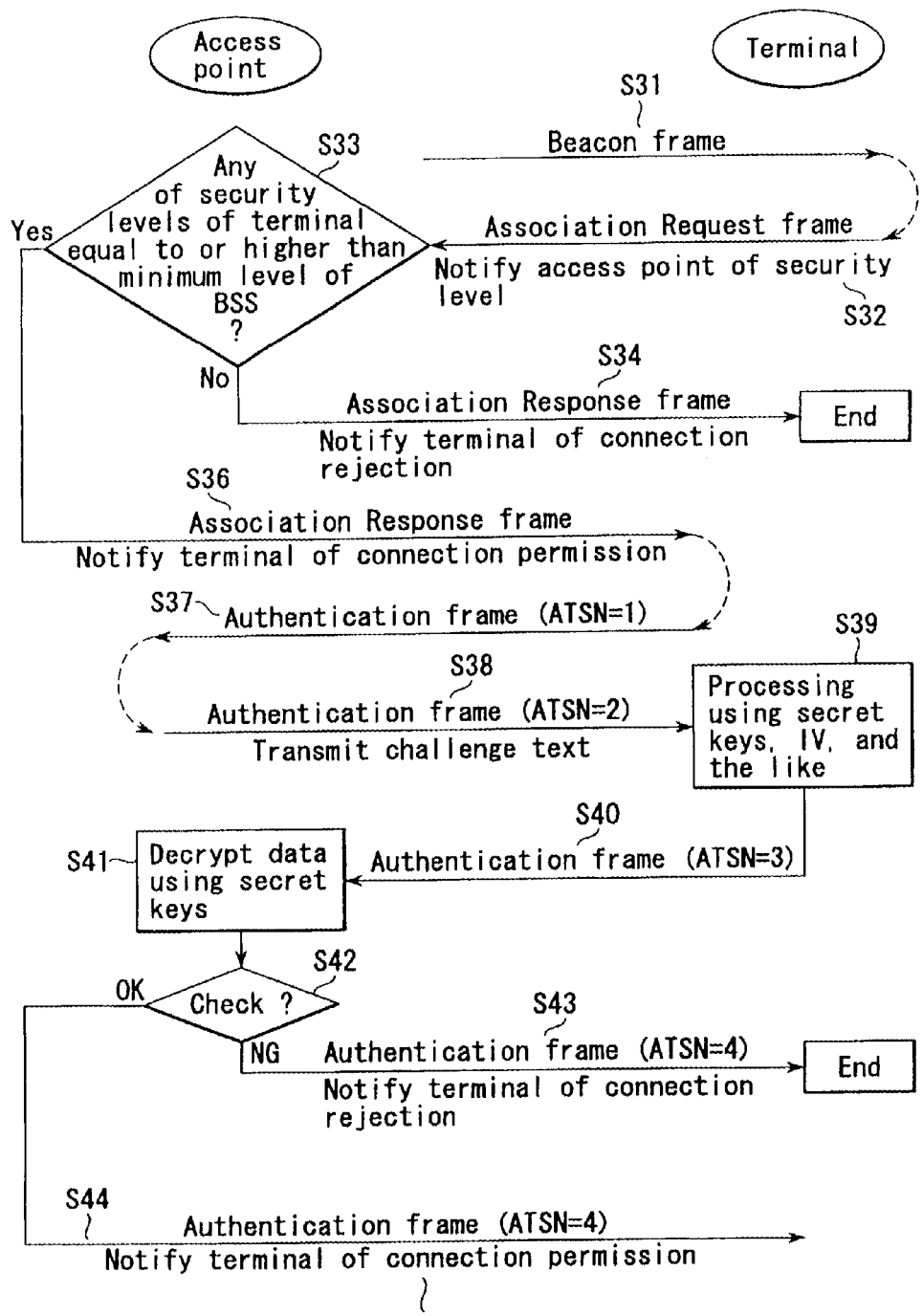
FIG. 13 is a flow chart showing a process procedure in which a security level is communicated using the association response frame transferred between the access point and terminal in the communication system shown in FIG. 1 and in which this security level is checked.
Figure 15:
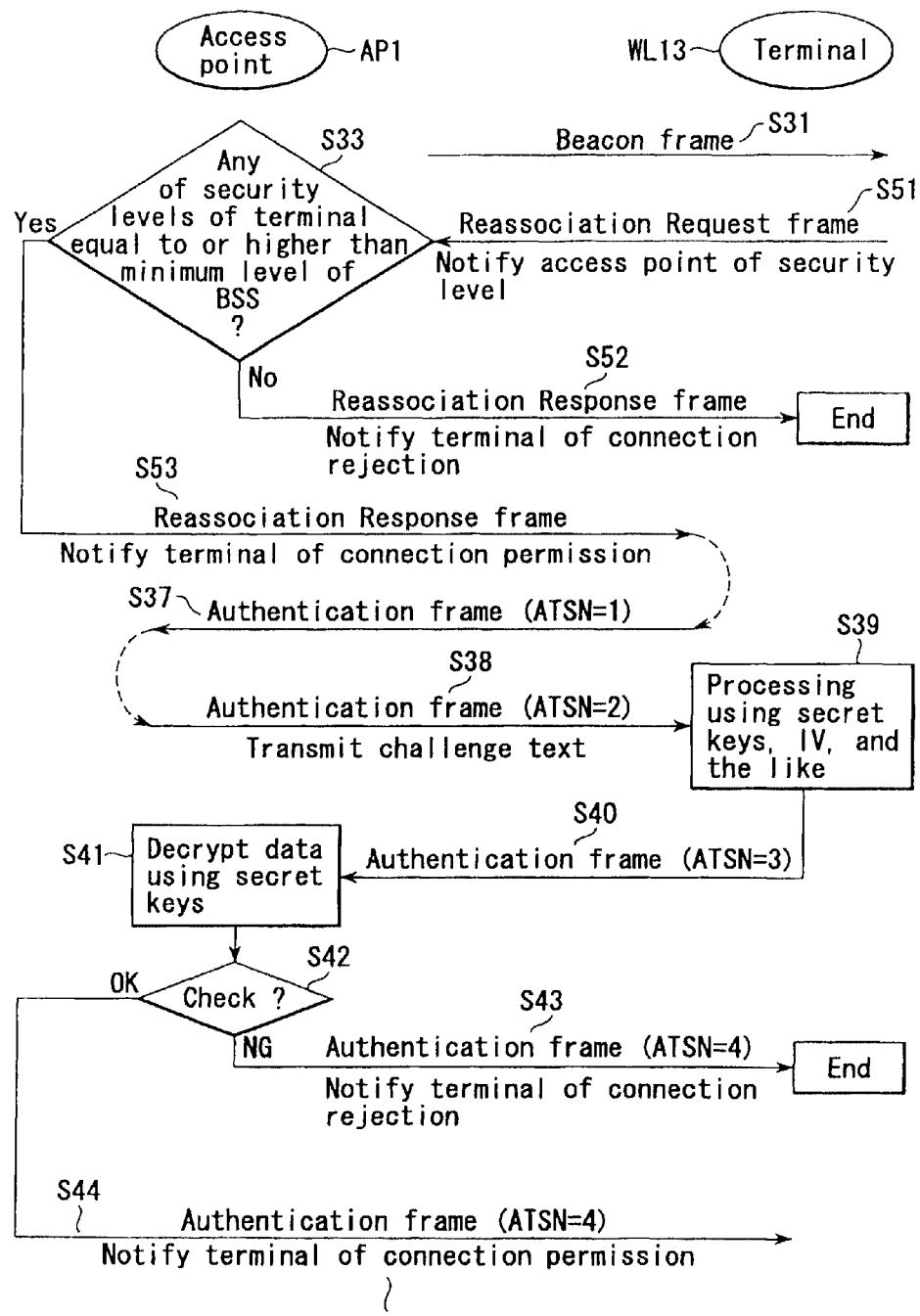
FIG. 15 is a flow chart showing a process procedure in which a security level is communicated using a reassociation response frame transferred between the access point and terminal in the communication system shown in FIG. 1 and in which this security level is checked.

Now, with reference to the flow chart shown in FIG. 15, description will be given of the case in which, in the wireless LAN system shown in FIG. 1, the terminal WL13 moves from the area of the access point AP2 to the area of the access point AP1, which is then subjected to reassociation. In FIG. 15, those parts which are the same as the corresponding parts of FIG. 13 are denoted by the same reference numerals, and their description is omitted. Different procedures compared to FIG. 13 will be described.

The terminal WL13 receives a beacon frame transmitted by the access point AP1 as shown in step S31. Then, to connect to the access point AP1, the terminal WL13 transmits a reassociation request frame to the access point AP1 as shown in step S51.

Figure 14A:
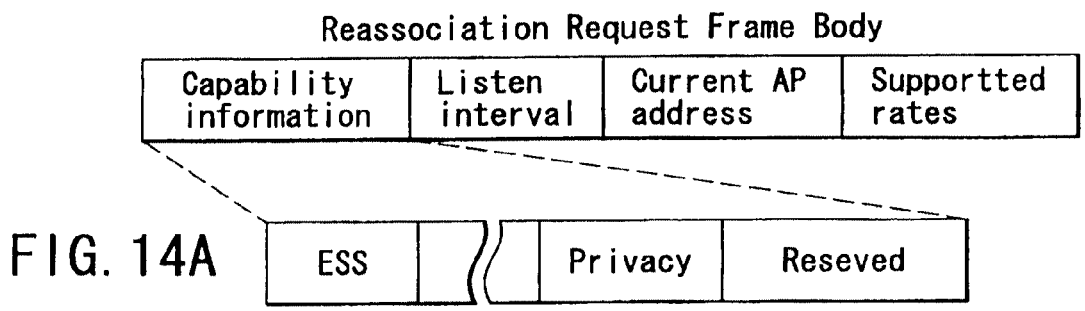
FIGS. 14A and 14B are schematic diagrams showing a reassociation request and response frames specified in the IEEE802.11 and transferred between the access point and terminal in the communication system shown in FIG. 1.
Figure 14B:
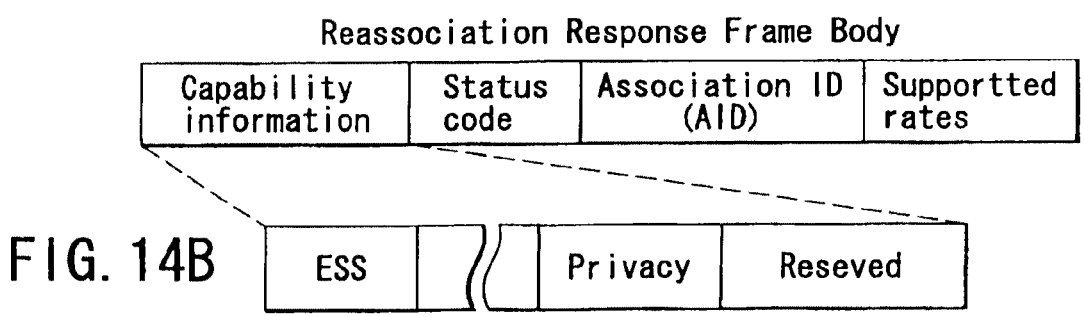

In the reassociation frame belonging to the MAC frame specified in the IEEE 802.11, the unused area, i.e. a reserved field is provided in the "Capability information" field of its frame body as shown in FIG. 14.

The transmission section 107 of the terminal WL13 writes at least a desired one of the security levels supported by the terminal WL13, in this reserved field, as shown in step S51. The transmission section 107 then transmits this frame to the access point AP1. For example, it is assumed that the transmission section 107 of the terminal WL13 writes one of all security levels ("enc.0" and "enc.1") possessed by the terminal WL13, "enc.1", in the reserved field and then transmits the frame to the access point AP1.

Upon receiving this frame, the access point AP1 performs process operations similar to those in the description of FIG. 13. Thus, see the description of step S33 in FIG. 13. However, if the access point AP1 rejects its connection to the terminal WL13 as in step S33, then according to the specification of the IEEE802.11, it writes a code in a status code field of a reassociation response frame, indicating that connection has failed. The access point AP1 then returns the frame to the terminal WL13 as shown in step S52. On the other hand, if the access point AP1 permits its connection to the terminal WL13, then according to the specification of the IEEE802.11, it writes a code in the status code field of the reassociation response frame, indicating that connection has succeeded. The access point AP1 then transmits this frame to the terminal WL13 as shown in step S53.

If the access point AP1 permits its connection to the terminal WL13, it and the terminal WL13 must share encryption parameters. For this purpose, as shown in steps S37 to S44 in FIG. 15, the authentication process or procedure, required to allow the terminal WL13 and the access point AP1 to share the encryption parameters, may be executed as in the case with FIG. 13 and according to the specification of the IEEE802.11.

Further, the reassociation request frame from the terminal WL13 contains the description of address of the access point to which the terminal WL13 is currently connected, i.e. the access point AP2. This address corresponds to "Current AP address", shown in FIG. 14. Thus, as shown in FIG. 15, the authentication procedure is not carried out. On the basis of "Current AP address", the access point AP1 connects to the access point AP2. Then, the access point AP1 may request the access point A2 to transfer the security information on the terminal WL13 registered in the security table of the access point AP2. After the security information has been transferred, the access point AP1 may register this security information in its security table. This allows the access point AP1 and the terminal WL13 to share the encryption parameters. Consequently, after the access point AP1 has permitted its connection to the terminal WL13, the terminal WL13 can transmit and receive a data frame encrypted with the same security level to and from the access point AP1 as in the case with the communication between the terminal WL13 and the access point AP2.

Of course, the communication system according to the fourth embodiment is also expected to produce effects similar to those of the first embodiment. Further, many variations of the fourth embodiment are possible as described in the first embodiment.

Fifth Embodiment

In the communication systems according to the first to fourth embodiments, the terminal WL13 can communicate with the access point AP1 at a security level equal to or higher than the minimum level preset for the BSS1 to which the access point AP1 belongs. However, the terminal WL13 may communicate with the access point AP1, while simultaneously communicating with a terminal or wireless station which is different from the access point AP1 and which is not subscribed to the BSS1. In such a case, if the security level used during this communication is lower than the minimum level preset for the BSS1, then as a result, the minimum security level of the BSS1 is not ensured. Thus, in the communication system according to the fifth embodiment, the following is possible: if the terminal WL13 is wirelessly communicating with a terminal WL14 as shown in FIG. 16, even if it issues a connection request to the access point AP1, the minimum security level preset for the BSS1 is ensured according to the procedure described below.

If the terminal WL13 is connected wirelessly to another terminal or an access point at a security level lower than the minimum level preset for the BSS1, it is most important to prevent the terminal WL13 from connecting to the access points or terminals within the BSS1. Accordingly, to connect to a terminal or access point within the BSS1, it is necessary to clear such a wireless connection at a low security level or raise the security level of the wireless connection up to or above the minimum level of the BSS1 in advance.

A procedure used for this purpose will be described below. Description will be given of only those parts of this procedure which are not contained in the procedure described in the first to fourth embodiments, with description of common parts omitted.

Figure 16:
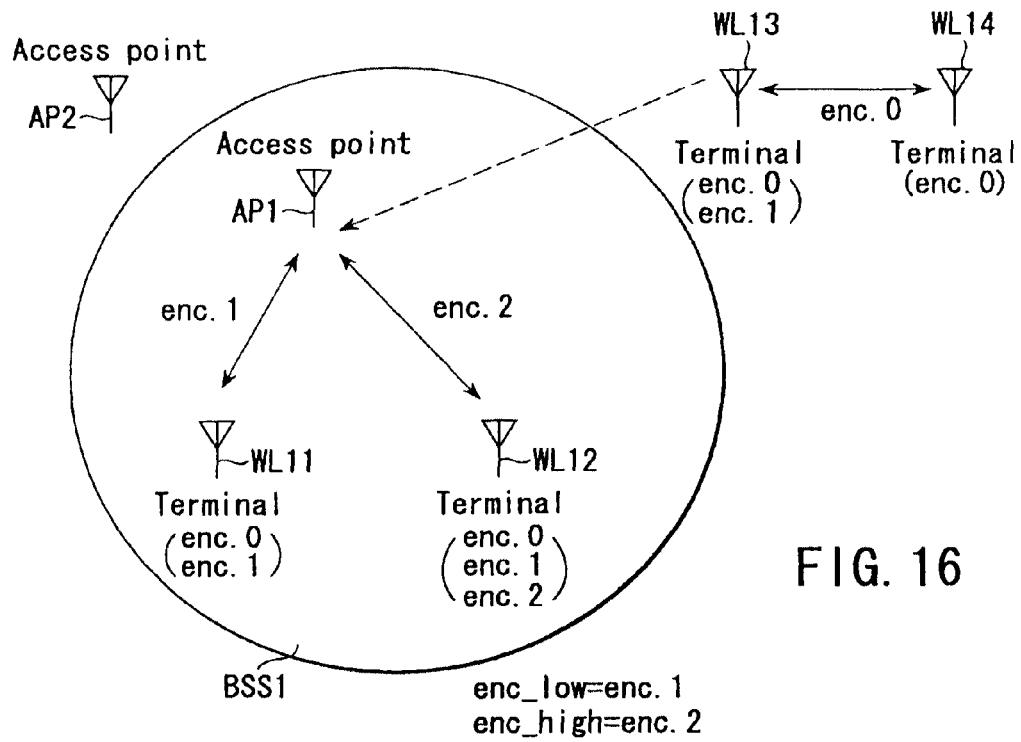
FIG. 16 is a schematic view showing a communication system according to another embodiment of the present invention.

In FIG. 16, those parts which are the same as the corresponding parts of FIG. 1 are denoted by the same reference numerals, and their description is omitted. It is assumed that the terminal WL14, shown in FIG. 16, supports only the security level "enc.0". It is also assumed that when the terminal WL13 starts issuing a connection request to the access point AP1, the terminal WL13 is already connected to the terminal WL14 at the communication security level "enc.0".

Description will be given of the case where, in such a state, the terminal WL13 issues a connection request to the access point AP1.

First, with reference to the flow chart in FIG. 17, description will be given of the case in which the minimum security level preset for the BSS1 is communicated using a beacon frame as described in the second embodiment. In this case, the terminal WL13 determines from the received beacon frame that "enc.1" is the minimum security level at which it can connect to the access point AP1. Thus, the terminal WL13 performs the process operations shown in FIG. 17 before proceeding to step S32 in FIG. 13.

Figure 17:
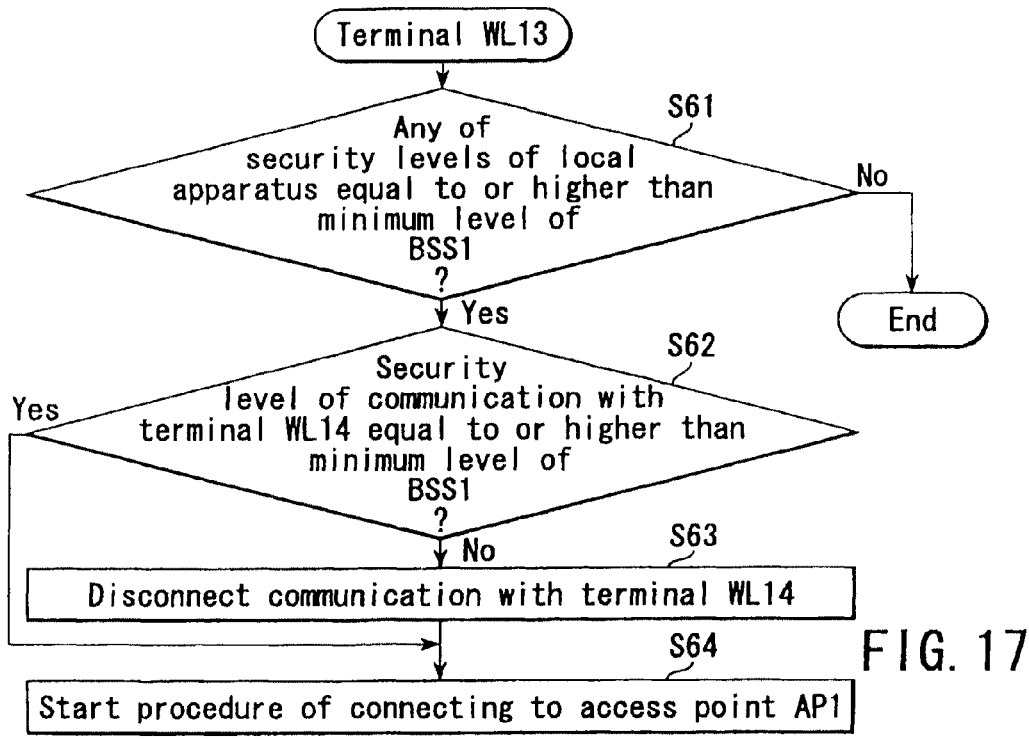
FIG. 17 is a flow chart illustrating an example of a process procedure executed by a wireless communication apparatus connected to another wireless communication apparatus in order to issue a connection request to still another wireless communication apparatus.

In step S61 in FIG. 17, the terminal WL13 checks whether or not any of its security levels are equal to or higher than the minimum permissible level "enc.1" in the BSS1. If any of the security levels of the terminal WL13 are equal to or higher than "enc.1", the terminal WL13 proceeds to step S62. In step S62, the terminal WL13 checks whether or not the security level of the communication between the terminal WL13 and the terminal to which it is currently connected, i.e. the terminal WL14 is equal to or higher than the minimum permissible level "enc.1" in the BSS1. If the security level of the communication between the terminal WL13 and the terminal WL14 is equal to or higher than the minimum permissible level "enc.1" in the BSS1, the terminal WL13 proceeds to step S64. Then, a procedure of connecting the terminal WL13 and the access point AP1 together is started. That is, the terminal WL13 executes process step S32 and the subsequent process steps in FIG. 13. On the other hand, if the security level between the terminal WL13 and the terminal WL14 is equal to or higher than the minimum permissible level ("enc.1") in the BSS1, the terminal WL13 proceeds to step S63. Then, the wireless connection between the terminal WL13 and the terminal WL14 is cleared. The terminal WL13 then proceeds to step S64.

As described above, since the security level between the terminal WL13 and the terminal WL14 is "enc.0", the terminal WL13 proceeds from step S62 to step S63. Then, the wireless connection between the terminal WL13 and the terminal WL14 is cleared. Subsequently, the terminal WL13 completes deauthentication specified in the IEEE802.11. The terminal WL13 then proceeds to step S64.

Thus, if the security level between the terminal WL13 and the terminal WL14, to which it is currently connected, is lower than that broadcast by the access point AP1, which issues a connection request to the terminal WL13, then the wireless connection between the terminals WL13 and WL14 is cleared before the terminal WL13 issues a connection request to the access point AP1. Consequently, a wireless connection is reliably established between the terminal WL13 and the access point AP1, while maintaining the minimum security level of the BSS1.

In step 63, after the wireless connection between the terminals WL13 and WL14 has been cleared, the terminals WL13 and WL14 may be wirelessly connected together at a security level equal to or higher than the minimum level of the BSS1 again.

The above description has taken by way of example the case in which the terminal WL13 is wirelessly connected only to the terminal WL14. However, if the terminal WL13 is connected wirelessly to a plurality of terminals or access points, each of the corresponding security levels is checked as described above. If these security levels are lower than the minimum level of the BSS1, the connection of the terminal WL13 with other terminals may be disconnected. Then, the terminal WL13 may set its security level equal to or higher than the minimum level of the BSS1. Subsequently, the terminal WL13 may start its connection to the access point AP1.

The above description has taken by way of example the terminal WL13 connected wirelessly to the terminal WL14. However, the above series of procedures are applicable to process operations performed by the access point AP2 in the BSS2, which is different from the BSS1. Thus, if both connection requester and connection request receiver are access points instead of terminals, then DC communication is possible in which the minimum security level is ensured for each of the plurality of BSSs. When the connection requester is an access point AP, this access point may be connected wirelessly to a plurality of terminals or access points. In such a case, each of the corresponding security levels may be checked as described above. If these security levels are lower than the minimum level of the BSS to connect to, the access point may disconnect those terminals WLs and access points APs. Then, the access point may set its security level equal to or higher than the minimum level of the BSS of interest. Subsequently, the access point may start its connection to the desired access point.

Figure 18:
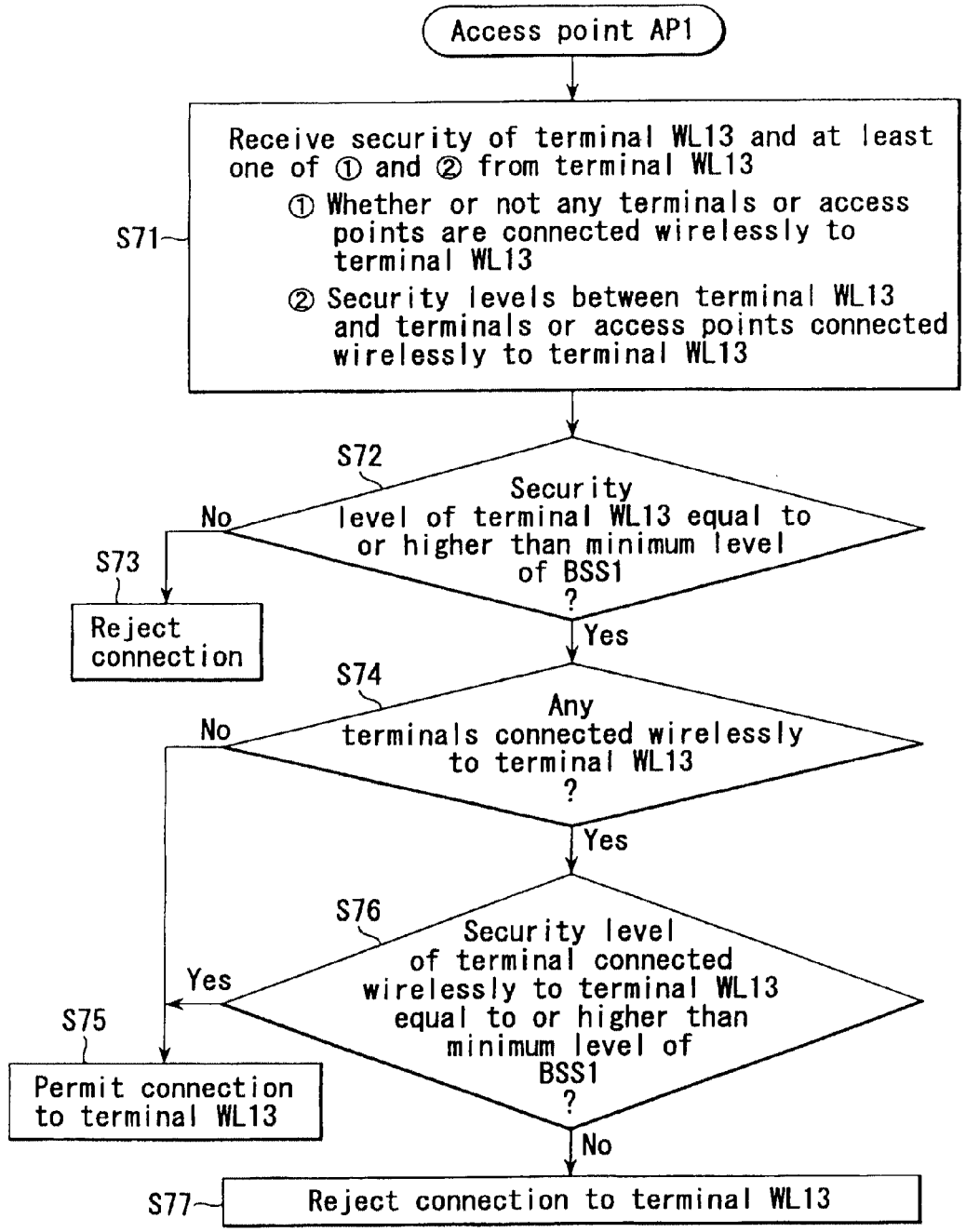
FIG. 18 is a flow chart illustrating an example of a process procedure executed by a wireless communication apparatus connected to another wireless communication apparatus in order to issue a connection request to still another wireless communication apparatus.

Now, with reference to the flow chart in FIG. 18, description will be given of the case in which the security levels of the terminal WL13 are checked for authentication, association, or reassociation as described in the first, third, and fourth embodiments. The process operations shown in FIG. 18 correspond to step S3 in FIG. 7, step S33 in FIGS. 13 and 15, and other steps.

If the security levels of the terminal WL13 are checked, the terminal WL13 not only writes its security levels in an unused area on an authentication, association, or reassociation request frame as described previously but also writes at least one of the items (1), (2) shown below, in the same or other unused area.

(1) Whether or not any terminals or access points are currently connected wirelessly to the terminal WL13, and (2) The security level between the terminal WL13 and terminals or access points currently connected wirelessly to the terminal WL13.

In this case, if the terminal WL13 is connected wirelessly to a plurality of terminals or access points, the security levels of all these connections are written in the unused area.

The access point AP1 receives a frame as shown in step S71. First, the access point AP1 checks the security level of the terminal WL13. If the security level of the terminal WL13 is lower than the minimum level set for the BSS1, the access point AP1 proceeds to step S73 to reject connection. That is, as described in the first, third, and fourth embodiments, the terminal WL13 is notified that connection has been rejected, using an authentication, association, or reassociation frame.

On the other hand, if the security level of the terminal WL13 is supported by the access point AP1 and is equal to or higher than the minimum level set for the BSS1, the access point AP1 proceeds to step S74. If the access point AP1 determines from the information (1) or (2) that no terminals or access points are currently connected to the terminal WL13, it proceeds to step S75. Then, the access point AP1 permits its wireless connection to the terminal WL13. That is, as described in the first, third, and fourth embodiments, the terminal WL13 is notified that the wireless connection has been permitted, using an authentication, association, or reassociation frame. Further, the subsequent processing is executed as described previously. This processing corresponds to step S6 in FIG. 7, step S36 in FIG. 13, step S53 in FIG. 15, and other steps. If the access point AP1 determines from the information (1) or (2) that one or more terminals or access points are currently connected to the terminal WL13, it proceeds to step S76.

In step S76, if the information received in step S71 contains the "security level between the terminal WL13 and the terminal WL14, to which the terminal WL13 is currently connected wirelessly", shown in (2), then this security level is checked. If the security level between the terminals WL13 and WL14 is equal to or higher than the minimum level set for the BSS1, then the access point AP1 proceeds to step S75 to permit its wireless connection to the terminal WL13. On the other hand, if the security level between the terminals WL13 and WL14 is lower than the minimum level set for the BSS1, or if the information received in step S71 does not contain the information shown in (2), i.e. if the security level between the terminals WL13 and WL14 is unknown, then the access point AP1 proceeds to step S77 to reject the connection request from the terminal WL13. As described in the first, third, and fourth embodiments, the terminal WL13 is notified that the connection request has been rejected, using an authentication, association, or reassociation frame.

In step S77, rather than being notified that the connection request has been rejected, the terminal WL13 may be similarly notified of a request for clearing of its wireless connection to the terminal WL14, using an authentication, association, or reassociation frame. In this case, the terminal WL13 can immediately determine that it can connect to the access point AP1 by clearing its wireless connection to the terminal WL14. Accordingly, after clearing its wireless connection to the terminal WL14, the terminal WL13 can issue a connection request to the access point AP1 again, for example, after completing the deauthentication specified in the IEEE802.11.

Further, in step S77, after rejecting the connection request, the access point AP1 may notify the terminal WL13 of the minimum permissible security level in the BSS1, using one of the management and control frames which is currently unused, the management and control frames belonging to the MAC frame specified in the IEEE802.11. For example, it is possible to use a management frame with a subtype of "0110" to "0111" or the like, or a control frame with a subtype of "0000" to "1001" or the like. If the terminal WL13 is notified of the minimum permissible security level in the BSS1, provided that the terminal WL14 can support this minimum security level, the terminal WL13 can reconnect to the BSS1 at this security level. Then, the terminal WL13 can issue a connection request to the access point AP1.

Further, the above description has taken by way of example the case in which the terminal WL13 is wirelessly connected only to the terminal WL14. However, even if the terminal WL13 is connected to a plurality of terminals or access points, it may notify the access point AP1 of the presence or absence of terminals or access points to which it is already connected and preferably the security levels of the respective connections. When the terminal WL13 notifies the access point AP1 of a plurality of security levels for the already established wireless communications, the access point AP1 may check each of these security levels in step S76.

As described above, the connection requester may be already connected wirelessly to other terminals or access points. In such a case, however, when the security levels of these wireless connections are unknown or are lower than the minimum level of the connection request receiver, the minimum security level of the connection request receiver can be ensured by rejecting this connection request. The above description has taken by way of example the terminal WL13 connected wirelessly to the terminal WL14. However, the above procedures are applicable as process operations performed by the access point AP2 in the BSS2, which is different from the BSS1. Thus, if both connection requester and connection request receiver are access points instead of terminals, then DC communication is possible in which the minimum security level is ensured for each of the plurality of BSSs. When the connection requester is an access point, this access point may be connected wirelessly to a plurality of terminals or access points. In such a case, as described above, the connection requester preferably notifies the connection request receiver of the presence or absence of terminals or access points to which it is already connected and preferably the security levels of the respective connections. When the connection request receiver notifies the connection requester of a plurality of security levels for the already established wireless communications, the connection requester may check each of these security levels in step S76.

Sixth Embodiment

Figure 19:
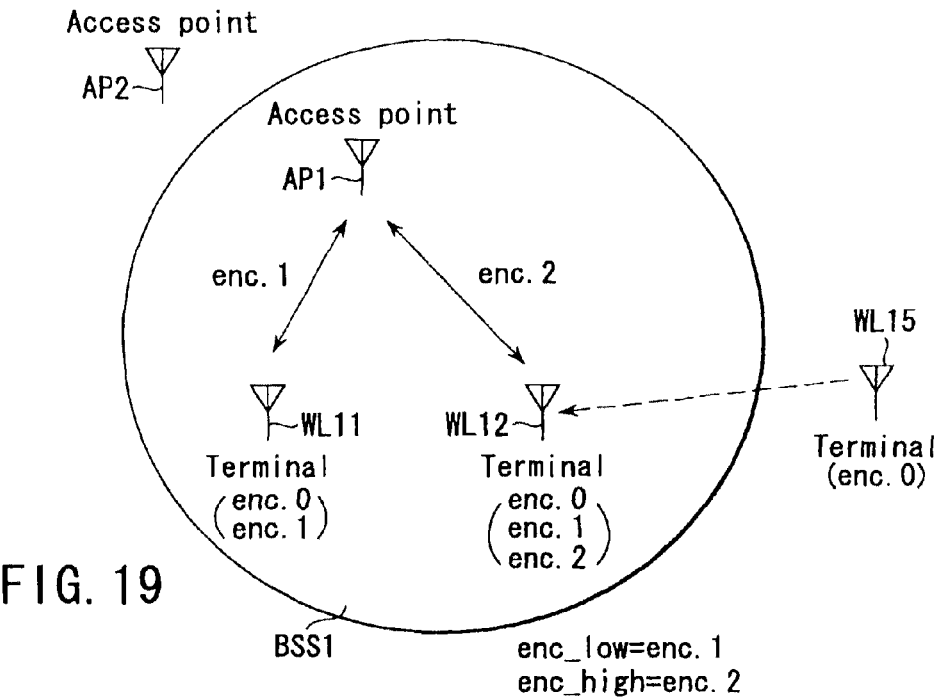
FIG. 19 is a block diagram schematically showing a communication system according to another embodiment of the present invention.

In the description of the wireless system according to the above described first embodiment, a connection request is issued to an access point. However, a similar method is applicable to the case in which one terminal issues a connection request to another terminal. In this case, description will be given taking by way of example the case in which a terminal WL15 not subscribed to the BSS1 issues a connection request to the terminal WL12, belonging to the BSS1, as shown in FIG. 19. The terminal WL15 can support only the security level "enc.0". The terminal WL12 is subscribed to the BSS1. Accordingly, for communication, the terminal WL12 must ensure the minimum security level preset for the BSS1. For this purpose, it is necessary to perform, between the terminal WL12 and WL15, process operations which are similar to those shown in FIG. 7 and which are performed between a terminal and an access point.

Figure 20:
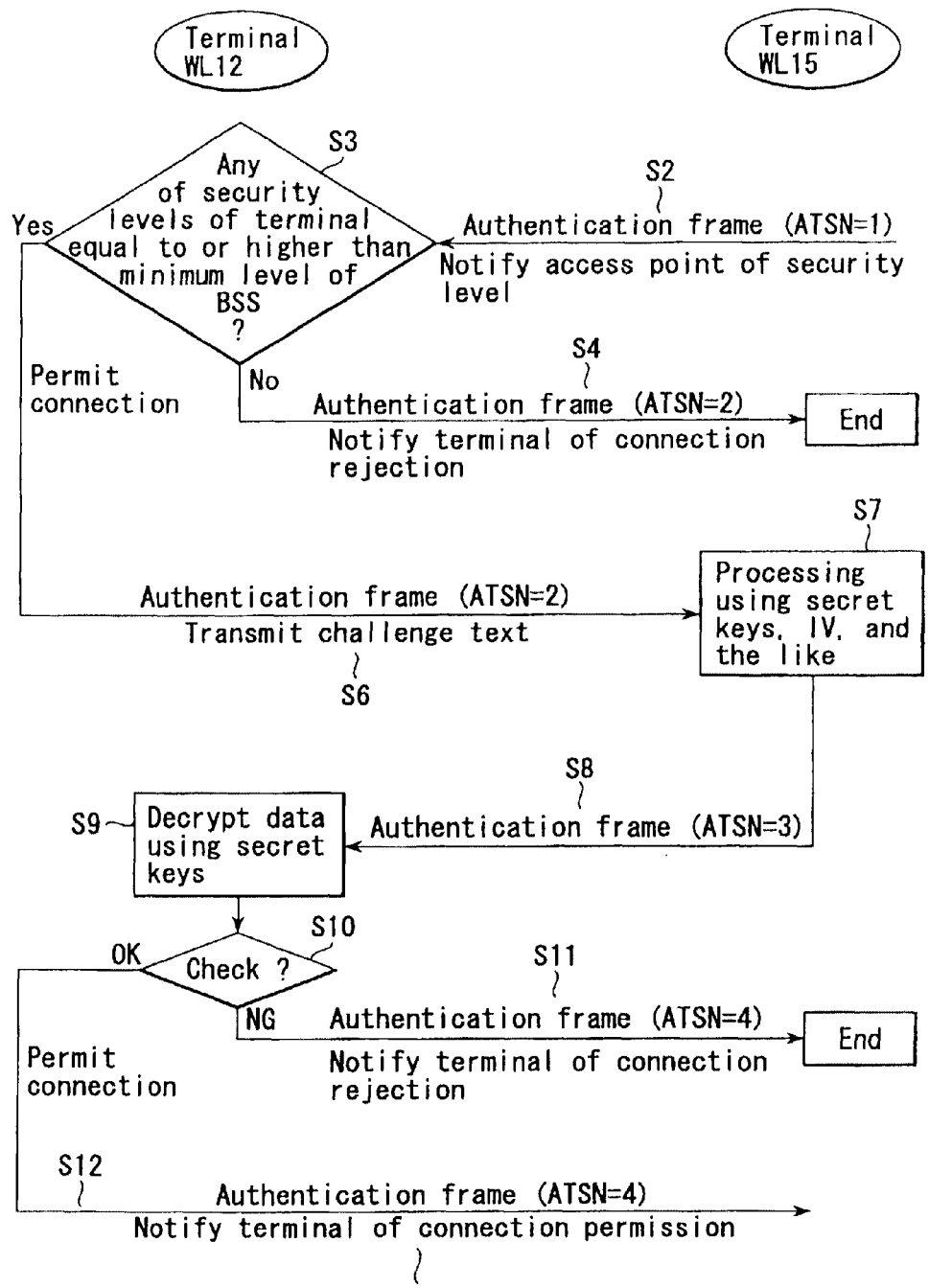
FIG. 20 is a flow chart illustrating a process procedure executed to wirelessly connect together terminals in the communication system shown in FIG. 19.

FIG. 20 shows a process procedure executed between the terminals WL12 and WL15 if the terminal WL15 issues a connection request to the terminal WL12. In FIG. 20, those parts, which are the same as the corresponding parts of FIG. 7, are denoted by the same reference numerals, and their description is omitted. Description will be given of those points, which are different from the corresponding points of FIG. 7.

In FIG. 20, the process operations performed by the access point shown in FIG. 7 correspond to the process operations performed by the terminal WL12. Accordingly, step S1, in which a beacon frame is transmitted, is not required. The other steps, i.e. steps S2 to S12 are similar to those in FIG. 7. In addition, the association procedure is not required.

As shown in FIG. 20, when connection setup between the terminals WL12 and WL15 is in process, the connection request receiving terminal WL12 checks the security level of the connection requesting terminal WL15. In this case, if the security level of the connection requesting terminal is supported by the connection request receiving terminal, and is equal to or higher than the minimum level of the BSS1 to which the connection request receiving terminal belongs, the terminal WL15 is permitted to be connected. If the security level of the connection requesting terminal is not supported by the connection request receiving terminal, or is lower than the minimum level of the BSS1 to which the connection request receiving terminal belongs, a connection to the terminal WL15 is rejected. If connection is permitted, process operations are performed in order to allow encryption parameters corresponding to the security level to be shared.

When the terminal WL12 receives a connection request from the terminal WL13, it performs such process operations as shown in FIG. 20 regardless of whether or not the terminal WL12 is connected wirelessly to the access point AP1.

In FIG. 19, a mode is applicable in which the terminal WL15 transmits a data frame directly to the terminal WL12 and this mode is called as an "ad hoc" mode. The "ad hoc" mode can be take place without undergoing authentication. This mode is called an "ad hoc" mode. With reference to the flow chart shown in FIG. 21, description will be given of process operations performed by the terminal WL12 in this mode.

The terminal WL12 receives a data frame from the terminal WL15 which is transmitted directly to the terminal WL12 without using any access points. For example, such a data frame is easily judged from the fact that both "To DS" and "From DS" in the frame control field of the MAC frame shown in FIG. 4 according to the specification of the IEEE802.11.

Upon receiving this data frame, the reception section 101 of the terminal WL12 checks whether or not the security information corresponding to the address of the sender of this data frame is registered in the security table 110 of the terminal WL12 as shown in step S82.

If the security information on the terminal WL15 is registered in the security table, this means that the terminal WL15 has communicated with the terminal WL12 at a security level equal to or higher than the minimum level preset for the BSS1. In some cases, it means that communication at such a security level is preset. Consequently, the terminal WL 12 proceeds to step S83. Then, the terminal WL12 transmits an ACK frame for the received data frame to the terminal WL15 to start transmitting and receiving data to and from the terminal WL15.

On the other hand, in step S82, if the security information on the terminal WL15 is not registered in the security table, the security level of the terminal WL15 is unknown. Accordingly, no communication is carried out between the terminals WL12 and WL15. Consequently, the terminal WL12 proceeds to step S84. The terminal WL12 may not transmit the ACK frame but notifies the terminal WL15 that it requires authentication. This notification may be carried out using one of the management and control frames which is currently unused, the management and control frames belonging to the MAC frame specified in the IEEE802.11. For example, it is possible to use a management frame with a subtype of "0110" to "0111" or the like, or a control frame with a subtype of "0000" to "1001" or the like.

Upon receiving this notification, the terminal WL15 may start the process operations in step S2 and the subsequent steps shown in FIG. 20. In the above described step 84, the terminal WL12 may transmit the ACK frame and the terminal WL15 may start the process operations in step S2 and the subsequent steps shown in FIG. 20.

In the above description, the communication procedure according to the fifth embodiment corresponds to a method of ensuring the minimum security level set for the BSS1 to which the access point AP1 belongs if the terminal WL13 is already connected wirelessly to the terminal WL14 as shown in FIG. 16 and issues a connection request to the access point AP1. Now, correspondingly, description will be given of the case in which the terminal WL15 is already connected wirelessly to the terminal WL16 and issues a connection request to the terminal WL12 as shown in FIG. 22.

In this case, the terminal WL16 can support only the security level "enc.0". The terminal WL12 is subscribed to the BSS1. Accordingly, to start communication, the terminal WL must ensure the minimum security level preset for the BSS1. For this purpose, the terminal WL12 may perform process operations similar to those shown in FIG. 18.

Figure 23:
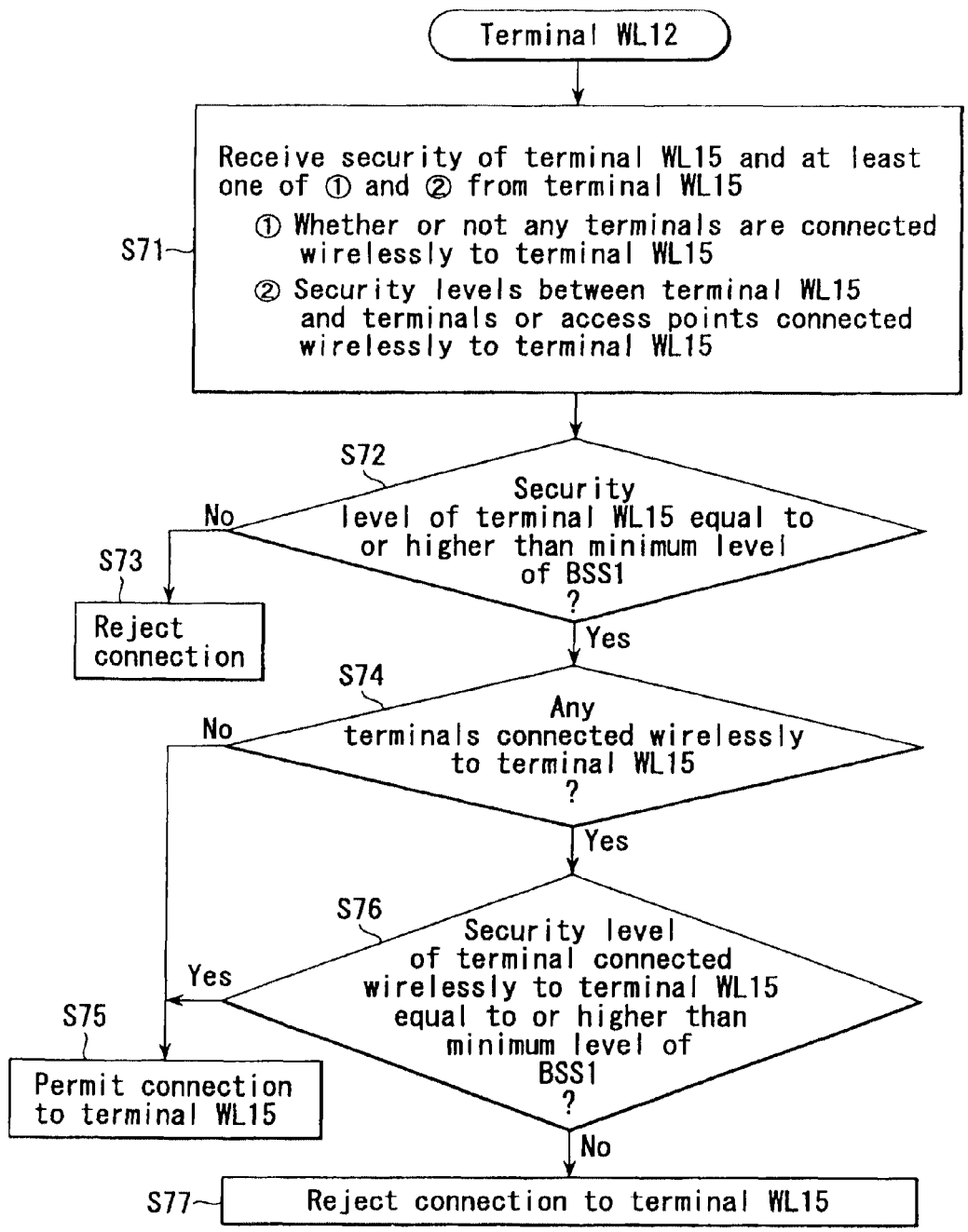
FIG. 23 is a flow chart illustrating another example of process operations performed by terminals in the communication system shown in FIG. 19 in order to wirelessly connect them together.

FIG. 23 shows a process procedure executed between the terminals WL12 and WL15 if the terminal WL15 issues a connection request to the terminal WL12. In FIG. 23, those parts which are the same as the corresponding parts of FIG. 18 are denoted by the same reference numerals, and their description is omitted. Description will be given below of those parts which are different from the corresponding parts of FIG. 18. That is, in FIG. 23, the process operations performed by the access point and terminal WL13 in FIG. 18 correspond to process operations performed by the terminals WL12 and WL15, respectively. That is, a process procedure is executed which is substantially similar to that shown in FIG. 18. Accordingly, the description given with reference to FIG. 23 can be understood simply by replacing the access point and terminal WL13 in the description of FIG. 18 with the terminals WL12 and WL15, respectively. Consequently, no special description is required.

Figure 21:
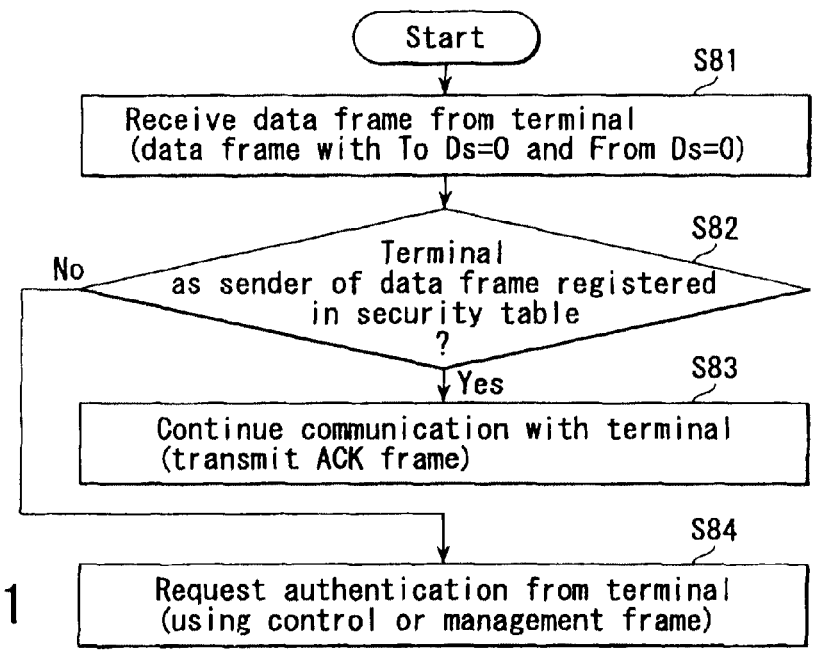
FIG. 21 is a flow chart illustrating an example of process operations performed by the terminals in the communication system shown in FIG. 19 in order to wirelessly connect them together.
Figure 22:
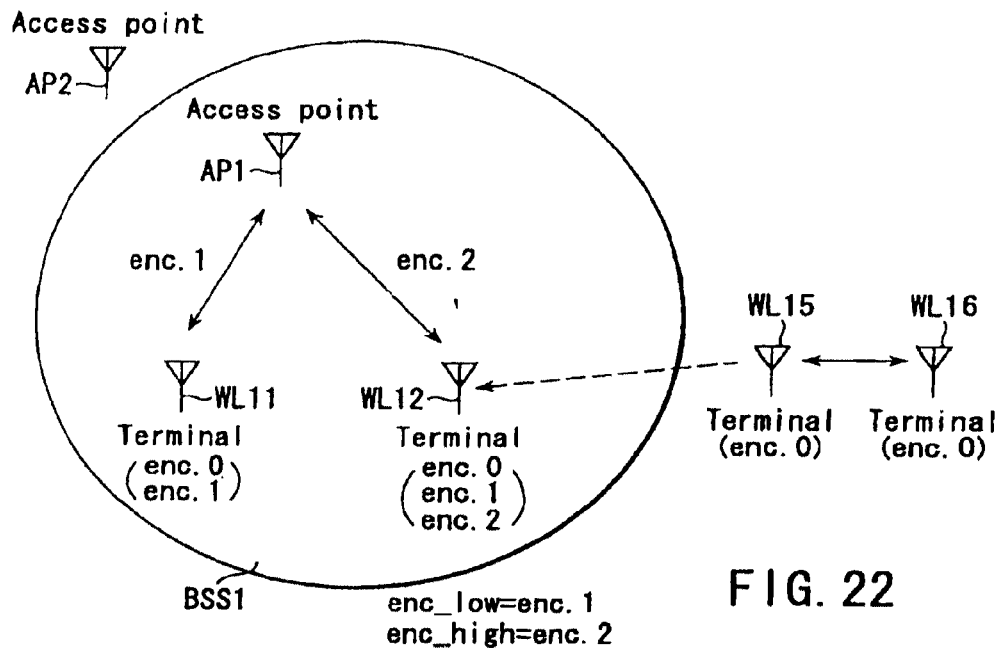
FIG. 22 is a schematic view showing a communication system according to yet another embodiment of the present invention.

Further, in FIG. 22, even in the mode in which the terminal WL15 transmits a data frame directly to the terminal WL12 without undergoing authentication, the terminal WL12 may perform such process operations as shown in FIG. 23 after the process operations shown in the flow chart in FIG. 21. Preferably, in step S81 in FIG. 21, upon receiving a data frame from the terminal WL15 which is transmitted directly to the terminal WL12 without using any access points, the terminal WL12 immediately proceeds to step S84 to notify the terminal WL15 that it requests authentication and then certainly perform the process operations shown in FIG. 23. This is desirable in ensuring security. This is because the security information on the terminal WL15 is registered in the security table of the terminal WL12, so that the terminal WL15 does not always use, for wireless connections with terminals other than the terminal WL12, communications at a security level equal to or higher than the minimum level of the BSS1 to which the terminal WL12 belongs.

The above description has taken by way of example the case in which the terminal WL15 is wirelessly connected only to the terminal WL16. However, even if the terminal WL15 is connected to a plurality of terminals or access points, it may notify the terminal WL16 of the presence or absence of terminals or access points to which it is already connected and preferably the security levels of the respective connections. When the terminal WL15 notifies the terminal WL16 of a plurality of security levels for the already established wireless communications, the terminal WL16 may check each of these security levels in step S76.

As described above, according to the above described sixth embodiment, even if a plurality of terminals communicate with each other, when one of the terminals belongs to the BSS for which the minimum security level to maintain is preset, this security level can be ensured.

Seventh Embodiment

In the above described first to sixth embodiments, the security level of the BSS is ensured. A similar method is also applicable to the case in which the security level of an IBSS is ensured.

Figure 24:
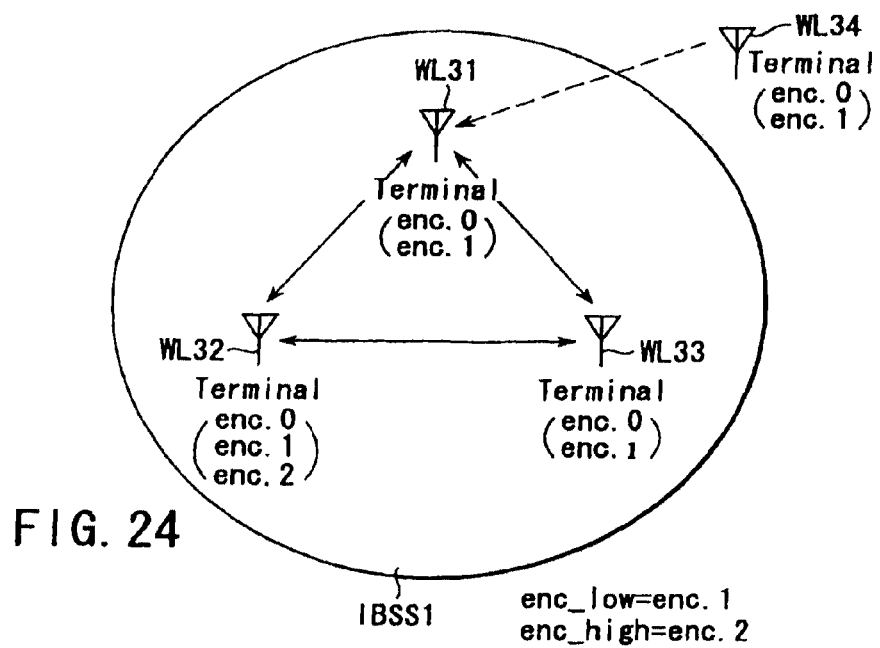
FIG. 24 is a schematic view showing a communication system according to still another embodiment of the present invention.

In the seventh embodiment, an IBSS1 configured as shown in FIG. 24 will be described by way of example.

In FIG. 24, the IBSS1 is composed of a plurality of, for example, three terminals WL31 to WL33. The terminal WL31 supports the security levels "enc.0" and "enc.1". The terminal WL32 supports the security levels "enc.0", "enc.1", and "enc.2". The terminal WL33 supports the security levels "enc.0" and "enc.1".

According to the specification of the IEEE802.11, a plurality of terminals within an IBSS can transmit and receive data frames directly to and from each other without using any access points or undergoing the authentication process. The minimum security level preset for the IBSS1 can be maintained between the terminals within the IBSS1 in the following manner: Each of the terminals within the IBSS1 is provided with a security table. The security information on the terminals constituting the IBSS1 is registered in the security table. Then, the terminals communicate with each other at a security level equal to or higher than the minimum security level preset for the IBSS1.

Then, description will be given of process operations performed by one of the plurality of terminals constituting the IBSS1, e.g. the terminal WL31 upon receiving a connection request from a terminal WL34 that is not subscribed to the IBSS1, i.e. not registered in the security tables.

These process operations are similar to those in the sixth embodiment. Thus, the terminal WL31 preferably performs such process operations as shown in FIG. 21. If the security information on the sender of the received data frame is not registered in the security table of the terminal WL31, the latter transmits the notification that it requests authentication, to the sender of the data frame, i.e. the terminal WL34. Subsequently, when the terminal WL34 transmits an authentication frame, the terminal WL31 preferably performs such process operations as shown in FIG. 23. However, the terminal WL15 shown in FIG. 23 may be replaced with the terminal WL34. That is, the terminal WL34 writes its security levels and at least one of the items (1) and (2), described above, in the authentication frame. The terminal WL34 then transmits this frame to the terminal WL31. Upon receiving such an authentication frame from the terminal WL34, the terminal WL12 may perform process operations similar to those performed by the terminal WL12 as shown in FIG. 23.

Thus, the IBSS can also ensure the minimum security level preset for itself.

Further, even if a plurality of terminals communicate with each other, when one of the terminals belongs to the IBSS for which the minimum security level to maintain is preset, this security level can be ensured.

As described above in the first to seventh embodiments, provided that each of the wireless communication apparatuses such as access points and terminals which constitute a wireless LAN has at least one (preferably a plurality of) security level and has characteristics shown below as (x1) to (x8), wireless communication is realized which, for example, ensures the encryption-based minimum security level preset for each basic group of a wireless LAN such as a BSS or an IBSS, i.e. a communication group. Further, if a plurality of terminals communicate with each other, when at least one of the plurality of wireless communication apparatuses belongs to the communication group for which the minimum security level to maintain or simply the minimum security level is preset, this security level is sure to be ensured. Those of the characteristics (x1) to (x8) which do not refer exclusively to access points should be possessed by both access points and terminals.

(x1) When a local apparatus issues a connection request to a first wireless communication apparatus, another wireless communication apparatus, it notifies the first wireless communication apparatus of at least one of its security levels as a first security level used for communication with the first wireless communication apparatus.

(x2) When issuing a connection request to the first wireless communication apparatus, if the local apparatus is already connected to a second wireless communication apparatus different from the first wireless communication apparatus, it notifies the first wireless communication apparatus of a second security level used for communication with the second wireless communication apparatus.

(x3) If the first wireless communication apparatus is an access point, when a minimum security level that enables connection has been broadcast to the first wireless communication apparatus, the local apparatus selects one of its security levels which is equal to or higher than the minimum level and notifies the first wireless communication apparatus of this security level in issuing a connection request to the first wireless communication apparatus.

(x4) If the first wireless communication apparatus is an access point, when a plurality of security levels that enable connection have been broadcast to the first wireless communication apparatus, the local apparatus selects one of its security levels which matches one of the plurality of security levels broadcast and notifies the first wireless communication apparatus of the selected security level in issuing a connection request to the first wireless communication apparatus.

(x5) The local apparatus comprises third means operating when it receives a connection request from a fourth wireless communication apparatus, another wireless communication apparatus, to (a) permit its connection to the fourth wireless communication apparatus at least if the security levels of the local apparatus include a third security level communicated by the fourth wireless communication apparatus and used for communication between the fourth wireless communication apparatus and the local apparatus and if the third security level is equal to or higher than a minimum level preset for a communication group (for example, a BSS or an IBSS) to which the local apparatus belongs, or to (b) reject its connection to the fourth wireless communication apparatus at least if the third security level is lower than the minimum level.

(x5') The third means (a) permits its connection to the fourth wireless communication apparatus when the third security level is equal to or higher than the minimum level preset for the communication group to which the local apparatus belongs to and when the fourth wireless communication apparatus is already connected to a fifth wireless communication apparatus different from the fourth wireless communication apparatus and if a fourth security level used for communication with the fifth wireless communication apparatus is equal to or higher than the minimum level, or to (b) reject its connection to the fourth wireless communication apparatus if the third security level is lower than the minimum level or if the fourth security level is lower than the minimum level or if the fourth security level is unknown when the fourth wireless communication apparatus is already connected to the fifth wireless communication apparatus.

(x7) If the local apparatus is an access point, it comprises fourth means for broadcasting the minimum security level preset for the communication group to which it belongs to or a plurality of security levels equal to or higher than the minimum level.

(x8) The local apparatus comprises fifth means operating when the fourth wireless communication apparatus notifies it of a plurality of security levels, to select one of those of the plurality of security levels which are equal to or lower than the minimum level preset for the communication group to which it belongs to and notifying the fourth wireless communication apparatus of the selected security level.

The present methods described in the present embodiments can be stored in a recording medium such as a magnetic disk (such as a floppy disk or a hard disk), an optical disk (such as a CD-ROM or a DVD), or a semiconductor memory as a program executed by a computer. This recording medium can then be distributed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication circuit comprising:
a receiver configured to receive at least one of a beacon frame and a probe response frame from a first wireless communication apparatus belonging to a first communication group, at least one of the beacon frame and the probe response frame including first security information indicating a first encryption method, the first encryption method to be applied to data transmitted to wireless communication apparatuses belonging to the first communication group; and
a transmitter configured to transmit an association request frame to the first wireless communication apparatus, the association request frame including second security information indicating a second encryption method which is supported by the wireless communication circuit, after a determination that the second encryption method overlaps with the first encryption method, and configured to decline to associate with the first wireless communication apparatus, if the first encryption method fails to overlap with the second encryption method, and configured to transmit a data frame including a frame body, the frame body including data encrypted by the second encryption method, after a reception of an association response frame including a status code that indicates successful association with the first wireless communication apparatus, wherein the association request frame includes a frame control field and a frame body, the frame body includes the second security information, the frame control field includes a type field, and the type field includes information indicating that the association request frame is classified as a management frame.

2. The wireless communication circuit according to claim 1, wherein the first encryption method corresponds to one of a first encryption algorithm having a first encryption strength and the first encryption algorithm having a second encryption strength different from the first encryption strength, and the second encryption method corresponds to one of the first encryption algorithm having the first encryption strength and the first encryption algorithm having the second encryption strength.

3. The wireless communication circuit according to claim 1, wherein the second encryption method is the highest encryption strength in a plurality of encryption methods which is supported by the wireless communication circuit.

4. The wireless communication circuit according to claim 1, wherein the association response frame includes an address indicating the first communication group.

5. The wireless communication circuit according to claim 1, wherein the frame control field further includes a protected frame field, and the protected frame field includes information indicating whether the frame body includes encrypted information.

6. A wireless communication device comprising:
an antenna; and
a wireless communication circuit according to claim 1,
wherein the receiver of the wireless communication circuit receives one of the beacon frame and the probe response frame through the antenna, and
the transmitter of the wireless communication circuit transmits the first association request frame and the data frame through the antenna.

7. A wireless communication device comprising:
a processor;
a wireless communication circuit according to claim 1; and
an antenna,
wherein the processor receives information included in one of the beacon frame and the probe response frame by using both the receiver of the wireless communication circuit and the antenna, and
the processor transmits information to be included in the association request frame by using both the transmitter of the wireless communication circuit and the antenna.

8. A wireless communication device comprising:
an antenna;
a processor; and
a wireless communication circuit according to claim 1,
wherein the processor transmits first information to be included in the data frame by using both the transmitter of the wireless communication circuit and the antenna,
the processor receives second information included in a second data frame from the first wireless communication apparatus by using both the receiver of the wireless communication circuit and the antenna.

9. The wireless communication device according to claim 8, wherein a type of the second information is either one of a video type, an audio type, or a text type, and the processor performs a process for the second information according to the type of the second information.

10. The wireless communication device according to claim 8, further comprising:
a display, wherein the processor displays at least part of the second information on the display.

11. The wireless communication device according to claim 8, further comprising:
a wired network interface, wherein the processor coupled to the wired network interface, and the processor receives third information via the wired network interface.

12. The wireless communication device according to claim 11, wherein the processor generates fourth information based on the third information, and the processor transmits the fourth information to be included in a data frame by using both the transmitter of the wireless communication circuit and the antenna.

13. A wireless communication method comprising:
receiving at least one of a beacon frame and a probe response frame from a first wireless communication apparatus belonging to a first communication group, at least one of the beacon frame and the probe response frame including first security information indicating a first encryption method, the first encryption method to be applied to data transmitted to wireless communication apparatuses belonging to the first communication group;
transmitting an association request frame to the first wireless communication apparatus, the association request frame including second security information indicating a second encryption method, after a determination that the second encryption method overlaps with the first encryption method;
declining to associate with the first wireless communication apparatus, if the first encryption method fails to overlap with the second encryption method;
transmitting a data frame including a frame body, the frame body including data encrypted by the second encryption method, after a reception of an association response frame including a status code that indicates successful association with the first wireless communication apparatus,
wherein the association request frame includes a frame control field and a frame body, the frame body includes the second security information, the frame control field includes a type field, and the type field includes information indicating that the association request frame is classified as a management frame.

14. The wireless communication method according to claim 13, wherein the first encryption method corresponds to one of a first encryption algorithm having a first encryption strength and the first encryption algorithm having a second encryption strength different from the first encryption strength, and the second encryption method corresponds to one of the first encryption algorithm having the first encryption strength and the first encryption algorithm having the second encryption strength.

15. The wireless communication method according to claim 13, wherein the second encryption method is the highest encryption strength in a plurality of encryption methods which is supported.

16. The wireless communication method according to claim 13, wherein the association response frame includes an address indicating the first communication group.

17. The wireless communication method according to claim 13, wherein the frame control field further includes a protected frame field, and the protected frame field includes information indicating whether the frame body includes encrypted information.

18. The wireless communication method according to claim 13, wherein one of the beacon frame and the probe response frame is received through an antenna, and the first association request frame and the data frame is transmitted through the antenna.

19. The wireless communication method according to claim 13, wherein information included in one of the beacon frame and the probe response frame is received by a processor, and information to be included in the association request frame is transmitted by the processor.

20. The wireless communication method according to claim 13, wherein first information to be included in the data frame is transmitted by a processor, and second information included in a second data frame from the first wireless communication apparatus is received by the processor.

21. The wireless communication method according to claim 20, wherein a type of the second information is either one of a video type, an audio type, or a text type, and the processor performs a process for the second information according to the type of the second information.

22. The wireless communication method according to claim 20, wherein at least part of the second information is displayed on a display by the processor.

23. The wireless communication method according to claim 20, wherein the processor is coupled to a wired network interface, and third information is received via the wired network interface by the processor.

24. The wireless communication method according to claim 23, wherein fourth information is generated based on the third information by the processor, and the fourth information to be included in a data frame is transmitted by the processor.

* * * * *